United States Patent
Shimizu et al.

(10) Patent No.: US 8,531,514 B2
(45) Date of Patent: Sep. 10, 2013

(54) IMAGE PROVIDING SYSTEM AND IMAGE PROVIDING METHOD

(75) Inventors: Motoaki Shimizu, Tokyo (JP); Hitoshi Imaoka, Tokyo (JP); Keiichi Chono, Tokyo (JP); Fumihiro Adachi, Tokyo (JP); Satoshi Nakazawa, Tokyo (JP); Shin Ishiguro, Tokyo (JP); Masayuki Yuguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 467 days.

(21) Appl. No.: 12/679,277

(22) PCT Filed: Sep. 18, 2008

(86) PCT No.: PCT/JP2008/066888
§ 371 (c)(1),
(2), (4) Date: Apr. 22, 2010

(87) PCT Pub. No.: WO2009/038149
PCT Pub. Date: Mar. 26, 2009

(65) Prior Publication Data
US 2010/0214400 A1 Aug. 26, 2010

(30) Foreign Application Priority Data
Sep. 20, 2007 (JP) .................. 2007-244530

(51) Int. Cl.
*H04N 7/18* (2006.01)
(52) U.S. Cl.
USPC ............. 348/77; 348/113; 348/172; 348/180; 348/376

(58) Field of Classification Search
USPC ............................ 348/77, 113–172, 180–376
See application file for complete search history.

(56) References Cited

U.S. PATENT DOCUMENTS

| | | | |
|---|---|---|---|
| 5,736,982 A * | 4/1998 | Suzuki et al. ................. | 715/706 |
| 7,206,022 B2 * | 4/2007 | Miller et al. ............. | 348/333.03 |
| 7,428,744 B1 * | 9/2008 | Ritter et al. ...................... | 725/10 |
| 7,457,705 B2 * | 11/2008 | Takahashi et al. ............ | 701/454 |
| 7,499,586 B2 * | 3/2009 | Agarwala et al. ............. | 382/154 |
| 7,565,139 B2 * | 7/2009 | Neven et al. ................ | 455/414.3 |
| 7,728,869 B2 * | 6/2010 | Jung ............................. | 348/113 |
| 7,957,567 B2 * | 6/2011 | Yamaguchi ................... | 382/118 |
| 8,032,842 B2 * | 10/2011 | Kwon et al. .................. | 715/850 |
| 8,098,894 B2 * | 1/2012 | Soderstrom ................... | 382/104 |
| 8,155,396 B2 * | 4/2012 | Ito ................................. | 382/118 |

(Continued)

FOREIGN PATENT DOCUMENTS

| | | |
|---|---|---|
| JP | 10-40485 A | 2/1998 |
| JP | 2000-276613 A | 10/2000 |

(Continued)

OTHER PUBLICATIONS

International Search Report for PCT/JP2008/066888, mailed Jan. 6, 2009.

(Continued)

*Primary Examiner* — Christopher S Kelley
*Assistant Examiner* — Jonathan Messmore

(57) ABSTRACT

A terminal has a visual axis by using which a user points to a target object. An information generating server acquires an internal image or an external image of the target object pointed by a user, and generates a display image which is displayed on the terminal.

15 Claims, 22 Drawing Sheets

(56) References Cited

U.S. PATENT DOCUMENTS

| | | | | |
|---|---|---|---|---|
| 2003/0221010 A1* | 11/2003 | Yoneya et al. | | 709/227 |
| 2005/0185060 A1* | 8/2005 | Neven, Sr. | | 348/211.2 |
| 2006/0012677 A1* | 1/2006 | Neven et al. | | 348/61 |
| 2006/0110008 A1* | 5/2006 | Vertegaal et al. | | 382/103 |
| 2006/0139183 A1* | 6/2006 | Suggs | | 340/933 |
| 2006/0155466 A1* | 7/2006 | Kanda et al. | | 701/209 |
| 2006/0240862 A1* | 10/2006 | Neven et al. | | 455/550.1 |
| 2006/0250322 A1* | 11/2006 | Hall et al. | | 345/8 |
| 2007/0298882 A1* | 12/2007 | Marks et al. | | 463/36 |
| 2009/0027732 A1* | 1/2009 | Imai | | 358/3.27 |
| 2009/0251533 A1* | 10/2009 | Smith et al. | | 348/77 |
| 2010/0020185 A1* | 1/2010 | Sako et al. | | 348/211.1 |
| 2010/0118116 A1* | 5/2010 | Tomasz et al. | | 348/36 |

FOREIGN PATENT DOCUMENTS

| | | |
|---|---|---|
| JP | 2002-238080 A | 8/2002 |
| JP | 2004-220312 A | 8/2004 |
| JP | 2005-236464 A | 9/2005 |
| JP | 2005-316914 A | 11/2005 |
| JP | 2006-134340 A | 5/2006 |

OTHER PUBLICATIONS

T. Muramatsu et al., "Improving the Situation Assessment Efficiency of Monitoring Systems Using Multiple Cameras", The Journal of the Institute of Image Information and Television Engineers, Jun. 1, 2005, vol. 59, No. 6, pp. 909-912.

Translation of International Preliminary Report on Patentability issued Jan. 6, 2009 in PCT/JP2008/06688.

Yoshiaki Takai, "Newest research example of virtual reality video monitoring support system based on mixed reality," Eizo Joho Industrial, Jul. 1, 2003, vol. 35, No. 7, pp. 23-28.

Denwayo, "Keitai denwa-yō 'camera king o riyō shita kūkan kensaku gijutsu' o kaihatsu—mobile application shijō ni pointing solution o teikyō," NEC Magnus Communications Ltd., Jul. 13, 2007.

* cited by examiner

Fig. 5

| OBJECT ID | SMALL BLOCK ID | POSITIONAL INFORMATION |
|---|---|---|
| 1 | 0 | $(X_{10}, Y_{10}, Z_{10})$ |
| 1 | 1 | $(X_{11}, Y_{11}, Z_{11})$ |
| 1 | 2 | $(X_{12}, Y_{12}, Z_{12})$ |
| ⋮ | ⋮ | ⋮ |
| N | M | $(X_{NM}, Y_{NM}, Z_{NM})$ |

Fig. 8

| OBJECT ID | SMALL BLOCK ID | POSITIONAL INFORMATION | IP ADDRESS |
|---|---|---|---|
| 1 | 0 | $(X_{10}, Y_{10}, Z_{10})$ | *.*.*.31 |
| 1 | 1 | $(X_{11}, Y_{11}, Z_{11})$ | *.*.*.35 |
| 1 | 2 | $(X_{12}, Y_{12}, Z_{12})$ | *.*.*.33 |
| ⋮ | ⋮ | ⋮ | ⋮ |
| N | M | $(X_{NM}, Y_{NM}, Z_{NM})$ | *.*.*.140 |

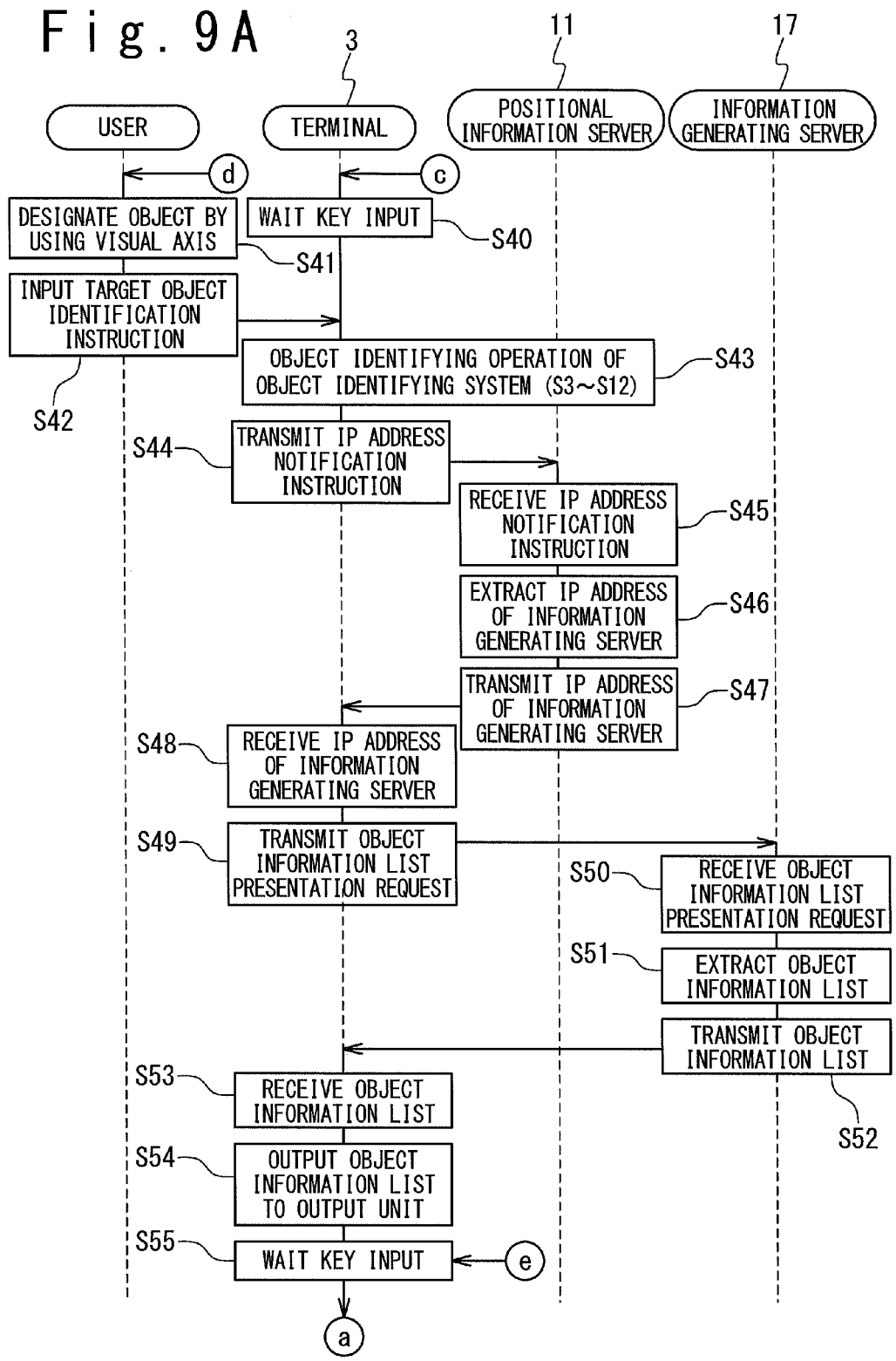

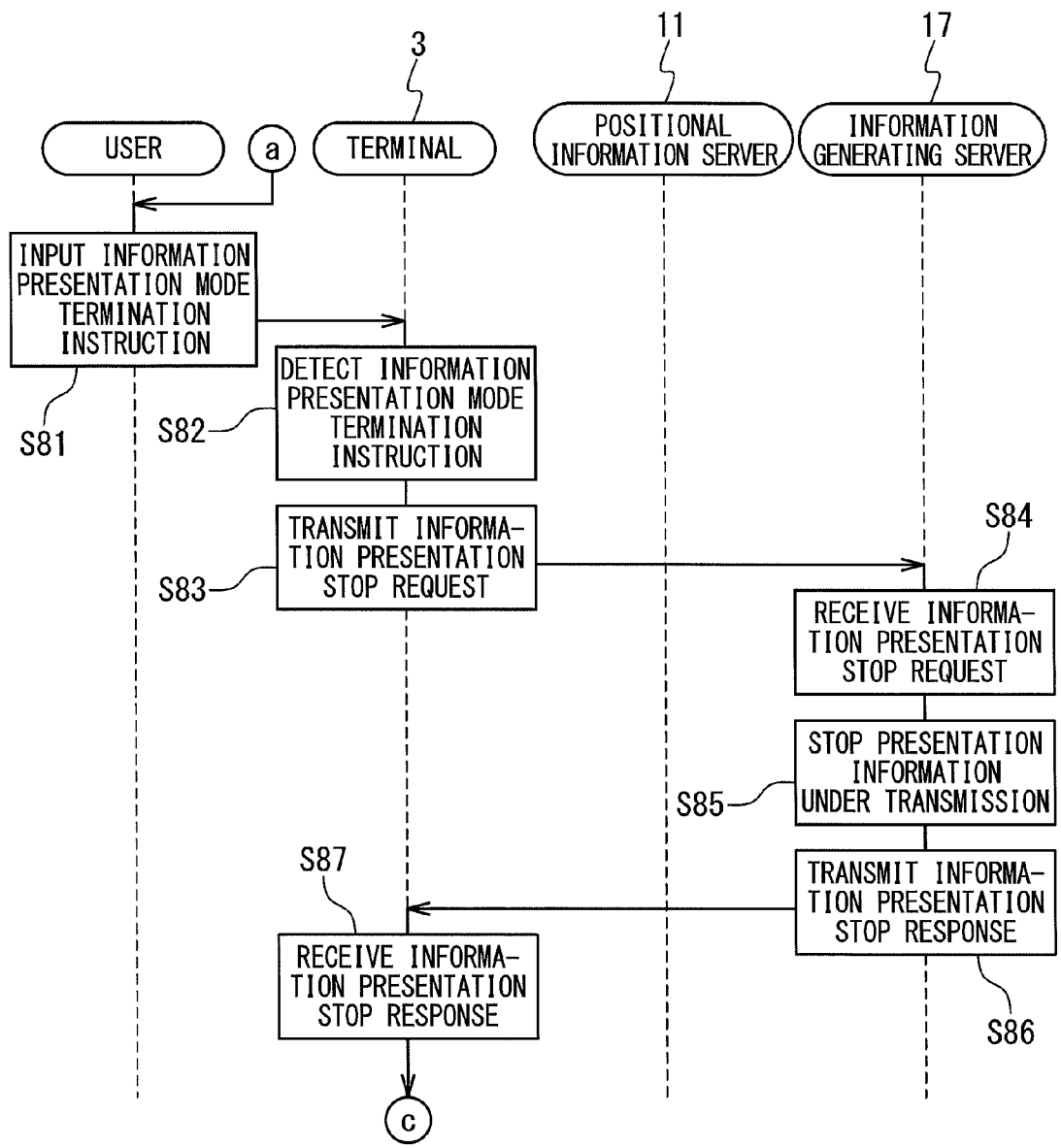

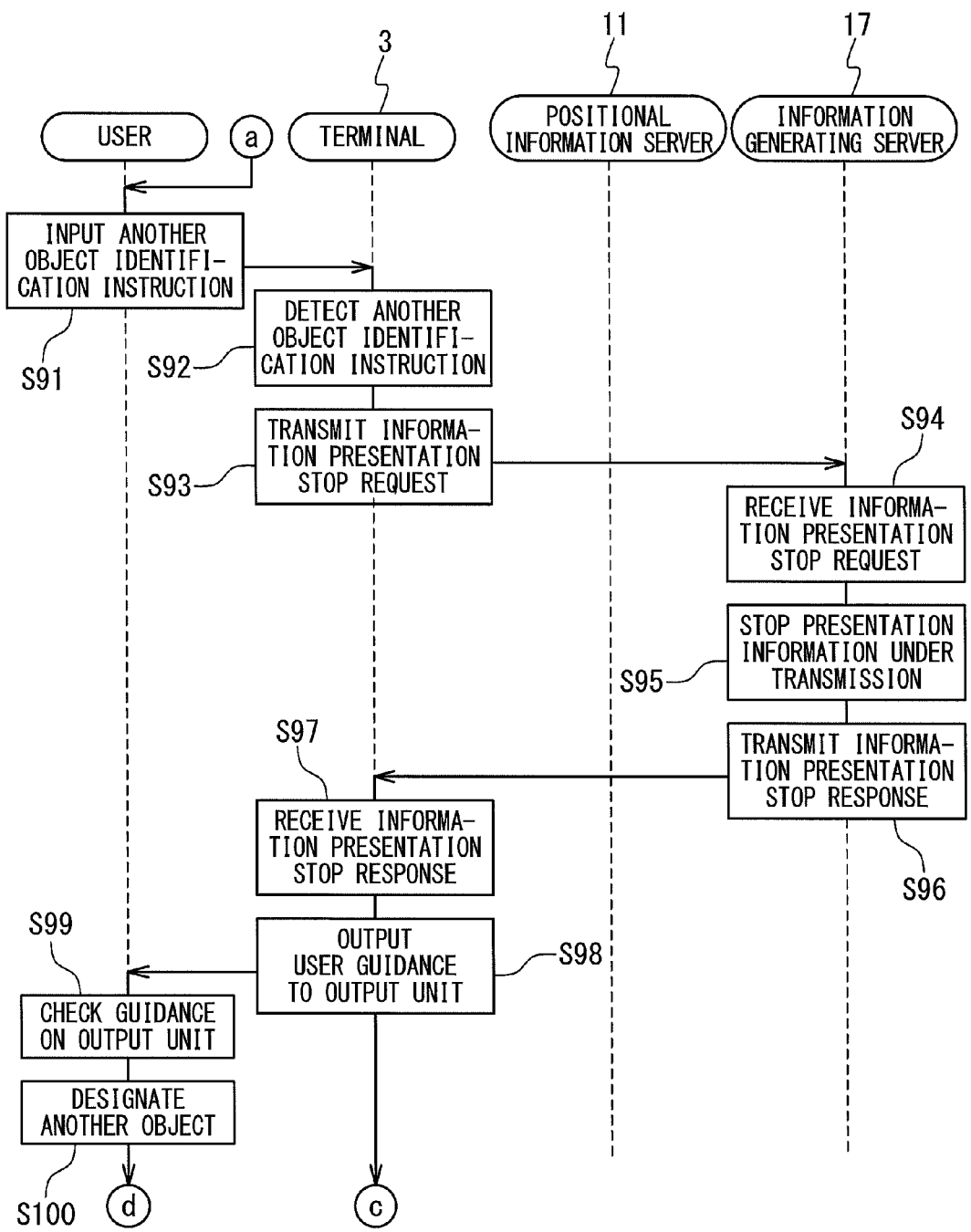

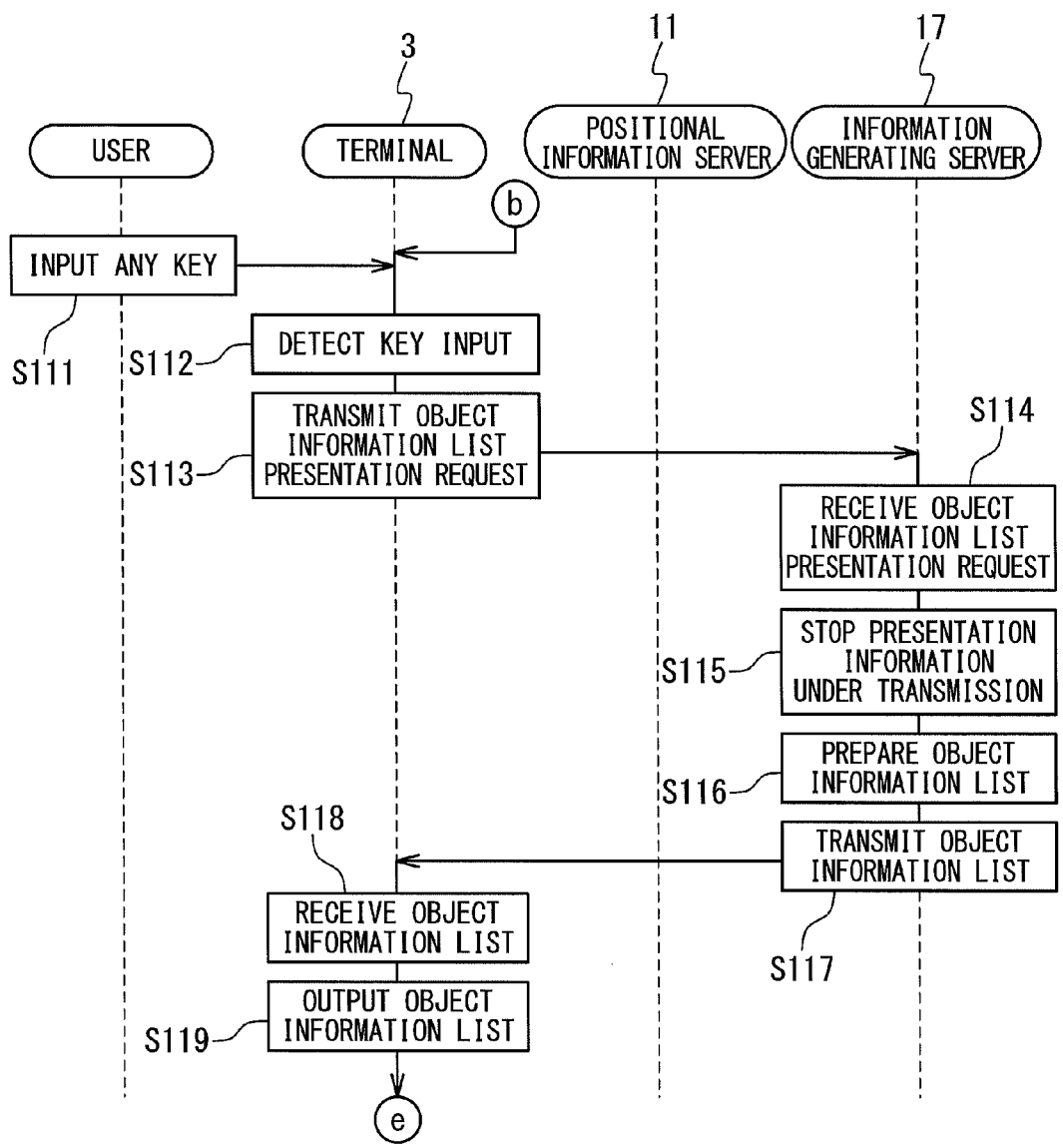

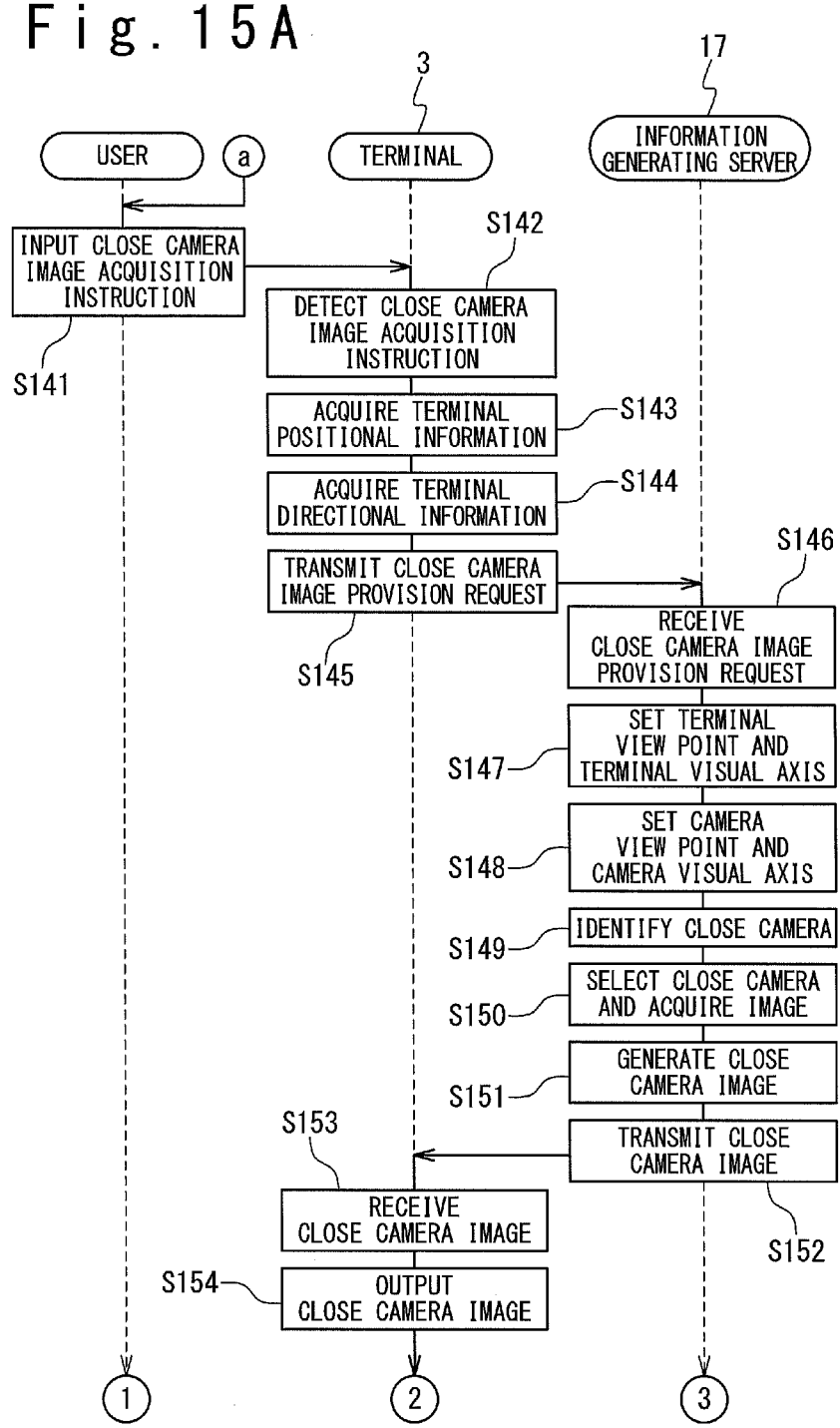

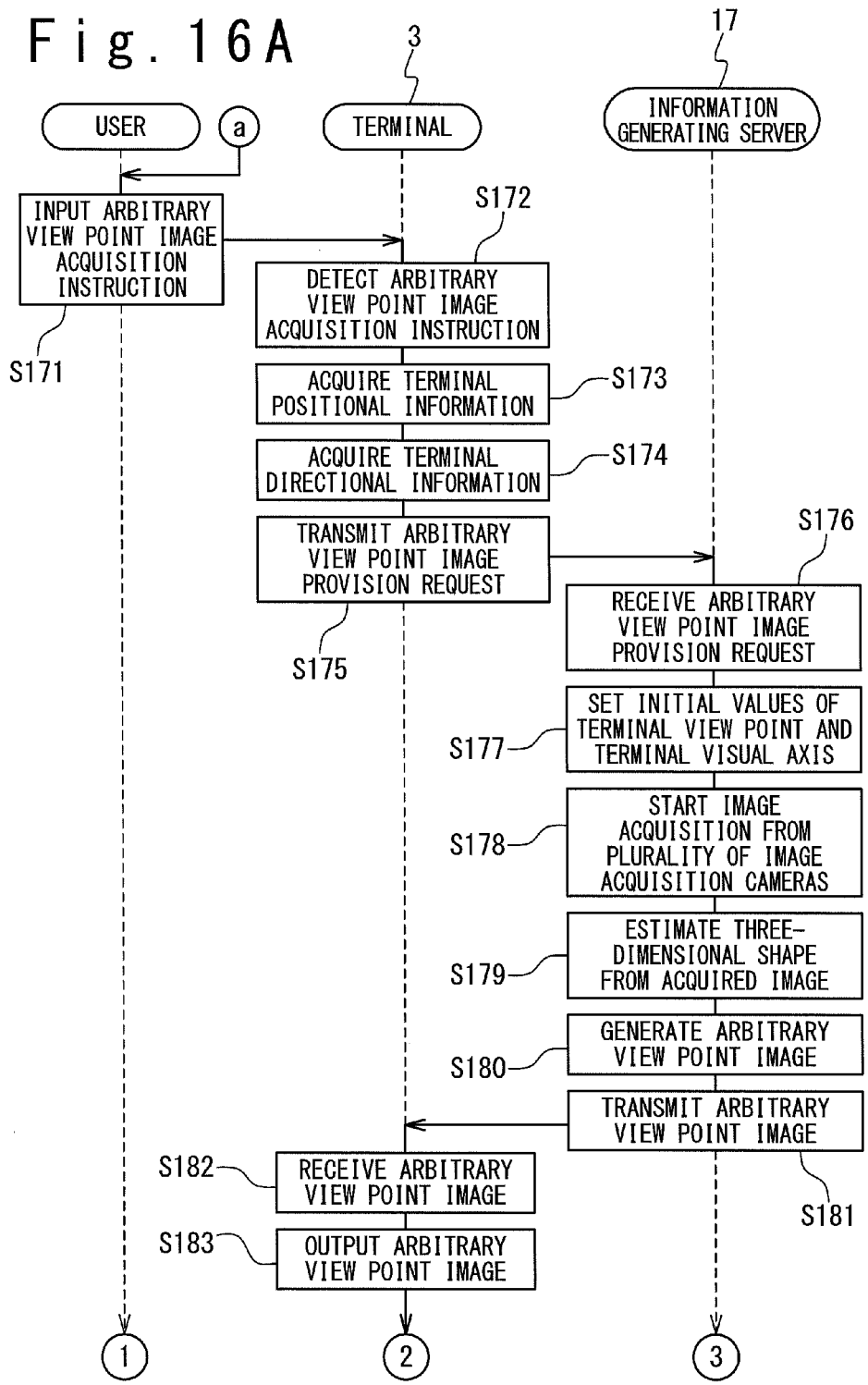

IMAGE PROVIDING SYSTEM AND IMAGE PROVIDING METHOD

This application is the National Phase of PCT/JP2008/066888, filed on Sep. 18, 2008, which is based upon and claims the benefit of priority from Japanese Patent Application NO. 2007-244530, filed on Sep. 20, 2007, the disclosure of which is incorporated herein in its entirety by reference.

TECHNICAL FIELD

The present invention relates to an image providing system, and in particular, relates to an image providing system for outputting an internal image or external image of an object which is arbitrarily pointed by a user by using a terminal, to the terminal.

BACKGROUND ART

Users have difficulty in information acquisition with the use of mobile information terminals in outdoor environments. A user usually tries to acquire information by recognizing a name and the like of such a target object as a building in advance. Therefore, the user can acquire information by using the name and the like of the target object as retrieval keys. However, there is a case that a user wants to acquire information of a target object existing within a range which can be seen from a position of the user in an outdoor environment. There is also a case that a user wants to acquire information of a target object at the front of the user. In such cases, the user does not have keys for information retrieval. Therefore, the user has difficulty in accurate information retrieval and information acquisition.

A sensor function is an important element for achieving comfortable information acquisition in outdoor environments. In recent years, high-precision small GPS (Global Positioning System) modules have come into wide use. For example, user navigation service is provided based on positional information detected by a small GPS provided to an information terminal, and map information and service information stored in a server. Therefore, even in outdoor environments, a user can carry out information retrieval by using the current position of the user as a key and acquire information of surroundings.

Spread of broadband mobile communication is another important element. Advancement in wired and wireless communication technologies accelerates the spread of wireless LAN terminals and third-generation portable phones, and thus makes high-speed data communication possible. Since high-speed data transfer has become possible, mobile information terminals become possible to provide applications such as television telephone, which require large data.

The progress in such elements makes it possible to achieve more comfortable information acquisition in mobile environment. Accordingly, it is considered that users will demand more various ways of information acquisition. Much consideration has been made with respect to ways of information acquisition in mobile environment. Related art to the various ways of information acquisition are disclosed as follows.

Japanese Patent Publication (JP-P2002-238080A) discloses a user terminal used in provision of information service by using portable telephones, which enables that information related to a building within a predetermined distance range from a position of the user terminal, service information of a shop in a specific building in sight and the like are acquired and that a movement direction of a user is precisely grasped. The user terminal of Japanese Patent Publication (JP-P2002-238080A) includes a detecting unit, a transmitting unit, a receiving unit, and a display unit. The detecting unit detects positional information that includes latitude, longitude, altitude, a direction, and an inclination angle of the terminal. The transmitting unit transmits the positional information detected by the detecting unit, to a server. The receiving unit, concerning the positional information transmitted by the transmitting unit, receives service information corresponding to at least a piece of three-dimensional space information including positional information among a plurality of pieces of three-dimensional space retrieval range information transmitted by the server and including latitude, longitude, altitude, and a bubble diameter of an object corresponding to three-dimensional space. The display unit displays the service information received by the receiving unit.

Japanese Patent Publication (JP-P2006-134340A) discloses a server used in provision of information service by using portable telephones, which enables that information related to a building within a predetermined distance range from a position of a user terminal, service information of a shop in a specific building in sight and the like are acquired and that a movement direction of a user is precisely grasped. The server of Japanese Patent Publication (JP-P2006-134340A) has a database, an extracting unit, and a providing unit. The database holds bubble data correlating space range information in three-dimensional space to retrieval information for obtaining service information to be provided. The extracting unit extracts based on positional information transmitted from the user terminal, specific retrieval information that corresponds to specific space range information including the positional information among the space range information held by the database. The providing unit provides to the user terminal, specific service information that corresponds to specific retrieval information extracted by the extracting unit.

Japanese Patent Publication (JP-A-Heisei 10-040485) discloses a home monitoring device capable of reporting to a habitant, checking with the eyes of the habitant, and remote-controlling by the habitant when he is away from his/her home. The home monitoring device of Japanese Patent Publication (JP-A-Heisei 10-040485) includes a fire detector, a report processing unit, a monitoring camera, and a monitoring processing unit. The fire detector detects change in a physical phenomenon such as smoke based on fire and sends a fire signal to a receiver. The report processing unit has a report addressee storage unit and a report data storage unit. The report addressee storage unit stores a report addressee of a portable terminal in advance. The report data storage unit stores report data. The report processing unit, based on the fire signal from the fire detector, calls the portable terminal set as an addressee in the report addressee storage unit through a public line, and sends the report data set in the report data storage unit when calling the portable terminal. In response to a reception of calling from a predetermined information terminal through a public line, the monitoring camera sends images taken by the monitoring camera to the information terminal. When receiving a camera control signal from the information terminal, the monitoring processing unit outputs a control signal to the monitoring camera based on the camera control signal.

However, according to those inventions, an internal image or an external image of a target object, which is arbitrarily designated by a user with the use of a terminal, can not be provided while providing a sense of see-through to the user.

DISCLOSURE OF INVENTION

An object of the present invention is to realize an image providing system that can provide an internal image or external image of a target object, which is arbitrarily designated by a user with the use of a terminal, to the user while providing a sense of see-through of the target object.

An image providing system of the present invention includes: a terminal which has a visual axis by using which a user points a target object to be identified from a plurality of objects and is configured to identify the target object pointed by the visual axis from the plurality of objects; an information generating server configured to acquire an internal image as an image of an inside of the target object or an external image as an image of external surroundings, which is taken from the target object, and generate a display image as an image to be outputted by the terminal based on the internal image or the external image, wherein the external surroundings can not be seen from the user with eyes thereof; and a positional information server configured to store object positional information as three-dimensional positional information of each of the plurality of objects and retrieval information as information for accessing to information generating server corresponding to the target object such that the object positional information and the retrieval information are respectively correlated to the each object. The terminal identifies the target object pointed by the visual axis based on a position of the terminal and a direction of the terminal, accesses the information generating server corresponding to the target object based on the retrieval information of the identified target object, acquires the display image of the target object from the information generating server, and displays the display image.

An object identifying system of the present invention includes: a terminal which has a user visual axis by using which a user points a target object to be identified from a plurality of objects and is configured to identify the target object pointed by the visual axis; and a positional information server that stores object positional information as three-dimensional positional information of each of the plurality of objects such that the object positional information is correlated to the each object. The user visual axis is a strait line connecting a user position indicating a position of the user and a terminal position indicating a position of the terminal. The terminal identifies the target object pointed by the user visual axis based on the user position, the terminal position, and the object positional information.

An image providing method of the present invention includes: (a) a step of identifying a target object pointed by a visual axis which is set to a terminal in order to point the target object as an object which a user intends to identify from a plurality of objects; (b) a step of accessing an information generating server corresponding to the identified target object; and (c) a step of displaying on an output unit of the terminal, an internal image as an image of inside of the target object or an external image as an image of outside, which is taken from the target object. The outside can not be seen from the user with eyes thereof.

An object identifying method of the present invention includes: ($\alpha$) a step of acquiring terminal positional information indicating a position of a terminal; ($\beta$) a step of detecting a face and both eyes of a user from an image acquired by a user image acquisition camera of the terminal; ($\gamma$) a step of setting a user position indicating a position of the user at a center point of a line connecting the both eyes of the user based on the image of the face and the terminal positional information; ($\delta$) a step of acquiring object positional information as positional information of the target object; and ($\epsilon$) a step of identifying from a plurality of objects, the to-be-identified target object pointed by the user visual axis based on the user position, the terminal positional information, and the object positional information.

According to the present invention, there realized is an image providing system that can provide an internal image or external image of a target object, which is arbitrarily designated by a user with the use of a terminal, to the user while providing a sense of see-through of the target object.

BRIEF DESCRIPTION OF DRAWINGS

The objects, advantages, and features of the above invention will be more apparent from the descriptions of certain exemplary embodiments taken in conjunction with the attached drawings in which:

FIG. 5 shows an example of positional information data of objects and small blocks recorded in a positional information server 11 according to the first exemplary embodiment;

FIG. 8 shows an example of positional information data of objects and small blocks and IP address data recorded in the positional information server according to the first exemplary embodiment;

FIG. 9A is an operational flow of the object information presenting system according to the first exemplary embodiment;

FIG. 10B is an operational flow of the object information presenting system according to the first exemplary embodiment in a case that "terminate information presentation mode" is selected from the object information list;

FIG. 10C is an operational flow of the object information presenting system according to the first exemplary embodiment in a case that "identify another object" is selected from the object information list;

FIG. 11 is an operational flow of the object information presenting system according to the first exemplary embodiment in a case that a key is inputted during information provision;

FIG. 15A is an operational flow of an image providing system according to the third exemplary embodiment;

FIG. 16A is an operational flow of an image providing system according to a fourth exemplary embodiment.

BEST MODE FOR CARRYING OUT THE INVENTION

An image providing system of the present invention is described below with reference to the attached drawings.

A whole image providing system is described in a first exemplary embodiment, and second to fourth exemplary embodiments are described thereafter in accordance with the difference in the way of provision of images.

First Exemplary Embodiment

First, the first exemplary embodiment is described. An image providing system according to the present exemplary embodiment of the invention includes an object identifying system and an object information presenting system. The object identifying system identifies a target object 2 designated by a user. The object information presenting system presents information related the target object 2 designated by the object identifying system, to a terminal 3. The description has its beginning with the object identifying system.

[Description of a Configuration of the Object Identifying System]

Figure 1:
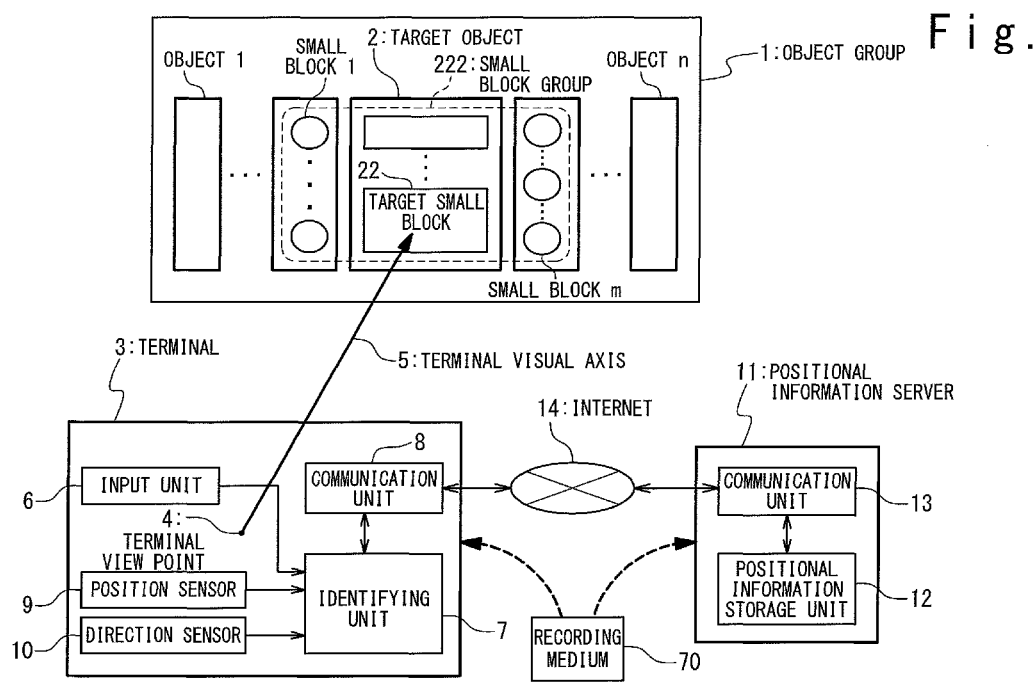
FIG. 1 shows a configuration of an object identifying system according to a first exemplary embodiment.

FIG. 1 shows a configuration of the object identifying system according to the present exemplary embodiment. The object identifying system includes an object group 1, the terminal 3, a positional information server 11, and Internet 14.

First, the object group 1 is described. The object group 1 is a set of N (N is an integer) of objects as targets for image acquisition. Each object of the object group 1 is a structure like a building for example. The object is set for every single building, for example. The target object 2 is an object designated in the object group 1. The target object 2 is designated by a user with the use of a terminal visual axis 5 of the terminal 3, which is mentioned later. A candidate object group 111 includes n (n is an integer, where N is the maximum) of objects extracted from the object group 1, as candidates for identifying the target object 2.

Each object of the object group 1 includes small blocks, which are parts of the object. The small block is set for every floor or every shop of each floor in the building as the object, for example. Note that there is also a case where small blocks are not set in the object. A small block group 222 is a set of all the small blocks, which are M (M is an integer) of small blocks included in the N of objects of the object group 1. A target small block 22 is a small block that is designated in the small block group 222. The target small block 22 is designated by the user with the use of the terminal visual axis 5 of the terminal 3, which is mentioned later. A candidate small block group 232 includes m (m is an integer, where M is the maximum) of small blocks extracted from the small block group 222, as candidates for identifying the target small block 22.

Hereinafter, when not particularly specified, the object group 1 includes the small block group 222, the candidate object group 111 includes the candidate small block group 232, the object includes the small block, and a case is included in which the target object 2 is the target small block 22.

Next, the terminal 3 is described. The terminal 3 designates the target object 2. The terminal 3 outputs an internal image of the designated target object 2. The terminal 3 has a terminal view point 4 at a specific position of the terminal 3. The terminal 3 has the terminal visual axis 5 directed from the terminal view point 4 toward a specific direction of the terminal 3. The terminal view point 4 indicates a present position of the terminal 3. The terminal visual axis 5 indicates a direction pointed by the terminal 3.

The user designates the target object 2 from the object group 1 by using the terminal visual axis 5. The terminal 3 is portable by the user. When the user moves the terminal 3, a position or direction of the terminal 3 is changed. By changing the position or direction of the terminal 3, the terminal view point 4 or the terminal visual axis 5 of the terminal 3 is changed.

The terminal visual axis 5 is conceptual, and it is not a problem whether the axis is visible or not. For example, when the terminal visual axis 5 is not visible, a mark is provided on a portion of the terminal 3. The user may designate the target object 2 from the object group 1 by directing the mark toward a direction of an object to be designated.

The terminal 3 includes an input unit 6, a position sensor 9, a direction sensor 10, a communication unit 8, and an identifying unit 7. The input unit 6 includes buttons for inputting user instructions, for example. The user inputs various instructions, which are mentioned later, through the input unit 6. The position sensor 9 is a GPS module for example. The position sensor 9 includes a receiving unit for satellite information and detects positional information of the terminal 3. The direction sensor 10 is a magnetic angle sensor for example. The direction sensor 10 detects directional information of the terminal 3 with respect to reference coordinates. The communication unit 8 is a communication module of a portable phone for example. The communication unit 8 includes a wireless communication unit with an antenna and carries out wireless communication with a base station of a mobile network. The communication unit 8 can communicate with a communication unit 13 of the positional information server 11 through a network such as the Internet 14. The identifying unit 7 identifies the target object 2. In response to a target object identification instruction inputted to the input unit 6 by the user, the identifying unit 7 acquires positional information of the terminal 3 from the position sensor 9 and directional information of the terminal 3 from the direction sensor 10. The identifying unit 7 determines a position of the terminal 3 based on the detected positional information. The determined position serves as the terminal view point 4. The identifying unit 7 determines a direction of the terminal based on the detected directional information. The determined direction is a direction pointed by the terminal 3 from the terminal view point 4 and serves as the terminal visual axis 5. Based on the positional information of the terminal 3, directional information of the terminal 3, and positional information of the candidate object group 111 acquired from the positional information server 11, and in accordance with a calculation method mentioned later, the identifying unit 7 identifies the target object 2 designated by the user with the use of the terminal visual axis 5.

Next, the positional information server 11 is described. The positional information server 11 includes the communication unit 13 and a positional information storage unit 12. The communication unit 13 can communicate with the terminal 3 through a network such as the Internet 14. The positional information storage unit 12 includes a database which records positional information of the objects in correspondence to the respective objects. Based on a request from the identifying unit 7 of the terminal 3, the positional information storage unit 12 extracts positional information of the candidate object group 111 serving as candidates for the target object 2, from the positional information of the object group 1 recorded in the database. The positional information storage unit 12 transmits the extracted positional information of the candidate object group 111 to the identifying unit 7 of the terminal 3 through the communication unit 13.

The terminal 3 and the positional information server 11 use the communication unit 8 of the terminal 3 and the communication unit 13 of the positional information server 11 to be connected through a network such as the Internet 14 for example, and can communicate with each other. Since the Internet 14 is known, its description is omitted.

Furthermore, the terminal 3 and the positional information server 11 are implemented by a CPU (Central Processing Unit), a hard disk, a ROM (Read Only Memory), a RAM (Random Access Memory) and the like (not shown). Functions of the terminal 3 and the positional information server 11 are implemented by software. A recording medium 70 records a program for implementing the functions of the terminal 3 and the positional information, server 11. When the functions of the terminal 3 and the positional information server 11 are implemented by software, the terminal 3 and the positional information server 11 are implemented by installing the program recorded in the recording medium 70 into the terminal 3 and the positional information server 11. The functions of the terminal 3 and the positional information server 11 can also be implemented by hardware. The above is the description of the configuration of the object identifying system.

[Description of Operation of the Object Identifying System]

Figure 2:
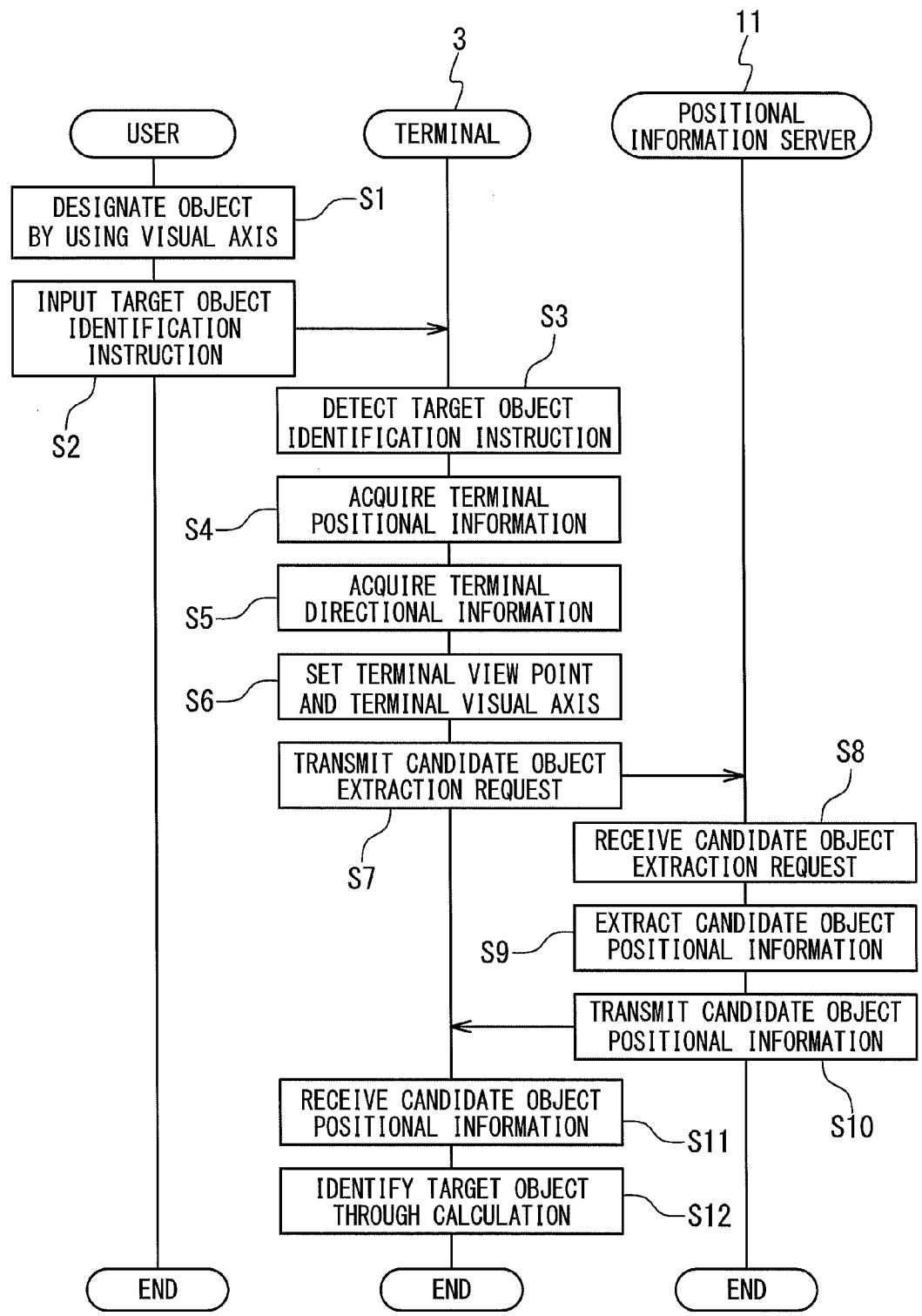
FIG. 2 is an operational flow of the object identifying system according to the first exemplary embodiment.

Next, an operation method of the object identifying system is described. FIG. 2 shows an operation method in which the object identifying system according to the present exemplary embodiment identifies the target object 2.

First, the user designates the target object 2 from the object group 1 by using the terminal visual axis 5 set to point a specific direction of the terminal 3 (S1). The user, while keeping designating the target object 2, inputs a target object identification instruction through the input unit 6 of the terminal 3 (S2). The input unit 6 detects the target object identification instruction and notifies the instruction to the identifying unit 7 (S3).

The identifying unit 7, in response to the notification from the input unit 6, acquires positional information of the terminal 3 from the position sensor 9 (S4). Additionally, the identifying unit 7 acquires directional information of the terminal 3 from the direction sensor 10 (S5). The identifying unit 7 sets the terminal view point 4 and the terminal visual axis 5 based on the positional information and directional information of the terminal 3 (S6). The identifying unit 7 transmits a candidate object extraction request, which includes the positional information of the terminal 3 and predetermined retrieval range information, to the positional information server 11 through the communication unit 8 (S7).

The positional information storage unit 12 of the positional information server 11 receives the candidate object extraction request through the communication unit 13 (S8). The positional information storage unit 12 extracts the candidate object group 111 from the object group 1 stored in the database based on the positional information of the terminal 3 and the retrieval range information included in the candidate object extraction request (S9). The positional information storage unit 12 transmits the candidate object group 111 and positional information of the candidate object group 111 to the terminal 3 through the communication unit 13 (S10).

The identifying unit 7 of the terminal 3 receives the positional information of the candidate object group 111, through the communication unit 8 (S11). The identifying unit 7 identifies the target object 2 designated by the user, in accordance with a calculation method which is mentioned later, based on the positional information of the candidate object group 111, the positional information of the terminal 3 and the directional information of the terminal 3 (S12).

The above is the description of the operation method of the object identifying system. In accordance with the operation method, the object identifying system can identify the target object 2 designated by the user.

Note that the above-mentioned retrieval range information are retrieval range parameters used when the positional information of the candidate object group 111 is extracted from the positional information of the object group 1 stored in the database of the positional information storage unit 12 of the positional information server 11.

Figure 3:
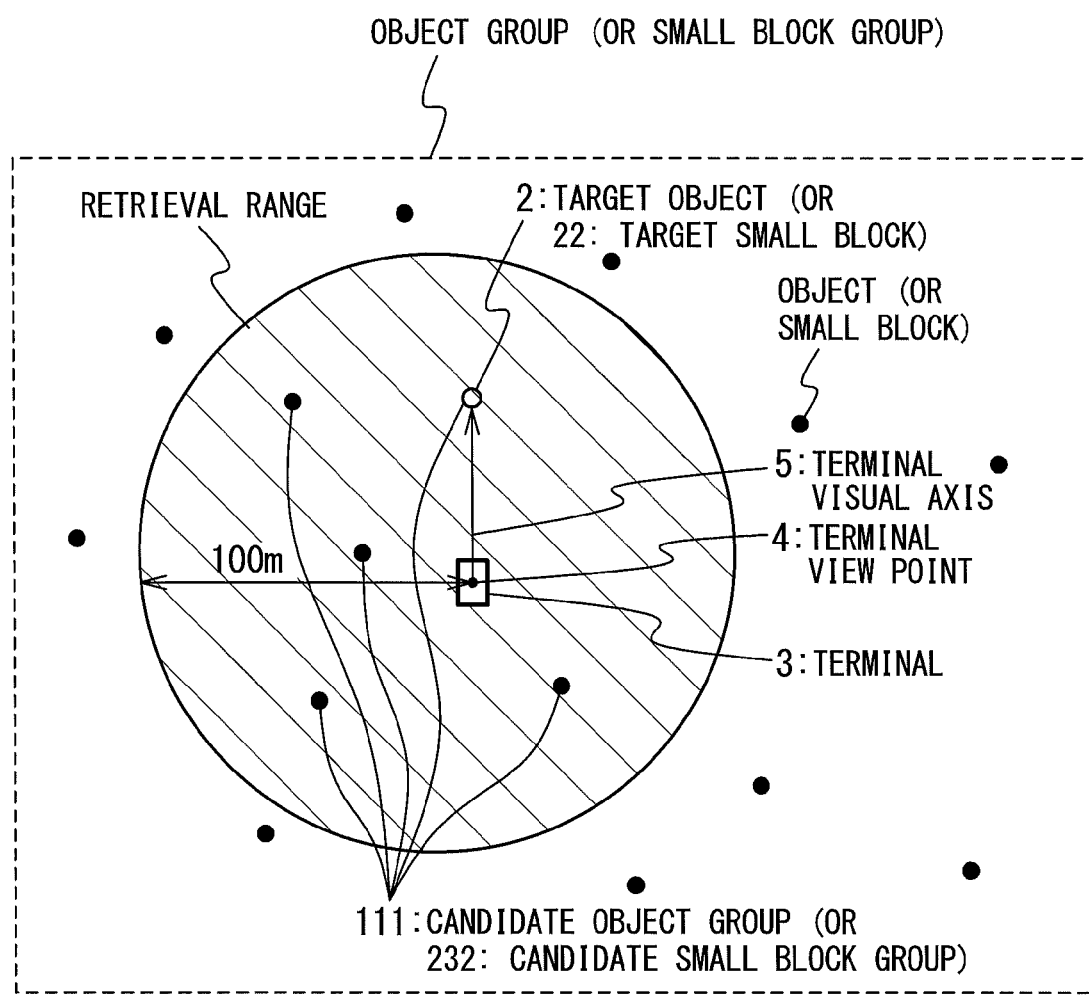
FIG. 3 shows relationships among retrieval range information and an object group, a candidate object group and a target object in the first exemplary embodiment.

FIG. 3 shows relationships among the retrieval range information and the object group 1, the candidate object group 111 and the target object 2. The retrieval range information indicates "a range within a radius of 100M with the terminal 3 as the center" for example. In this case, the positional information storage unit 12 extracts, based on the positional information of the terminal 3, objects positioned within a circle with the radius of 100 M with the terminal 3 as the center, as the candidate object group 111 from the positional information of the object group 1 stored in the database.

Indication methods of the retrieval range information are not limited to the above-mentioned indication method. For example, a certain angle width from the direction of the terminal 3 and a distance from the terminal 3 may be indicated. Additionally, the retrieval range information is not limited to indication in two dimensions but may be indication in three dimensions. In such a case, the terminal 3 changes items of the retrieval range information included in the candidate object extraction request in (S7) of FIG. 2. The terminal 3 transmits the retrieval range information including the directional information in addiction to the positional information of the terminal 3. As mentioned above, the terminal 3 transmits information required for retrieval in correspondence to the indication method of the retrieval range information.

Furthermore, the retrieval range information may be set in advance in the positional information storage unit 12 of the positional information server 11. In this case, a method is considered in which retrieval range information is set in the same manner without depending on the terminal 3. Alternatively, a method is also possible in which the positional information storage unit 12 stores retrieval range information corresponding to an identifier of every terminal 3 and selects different retrieval range information depending on the terminal 3. Furthermore, a method is also possible in which retrieval range information is inputted simultaneously through the input unit 6 of the terminal 3 when the user inputs the target object identification instruction.

[Description of Calculation Methods of the Object Identifying System]

Figure 4:
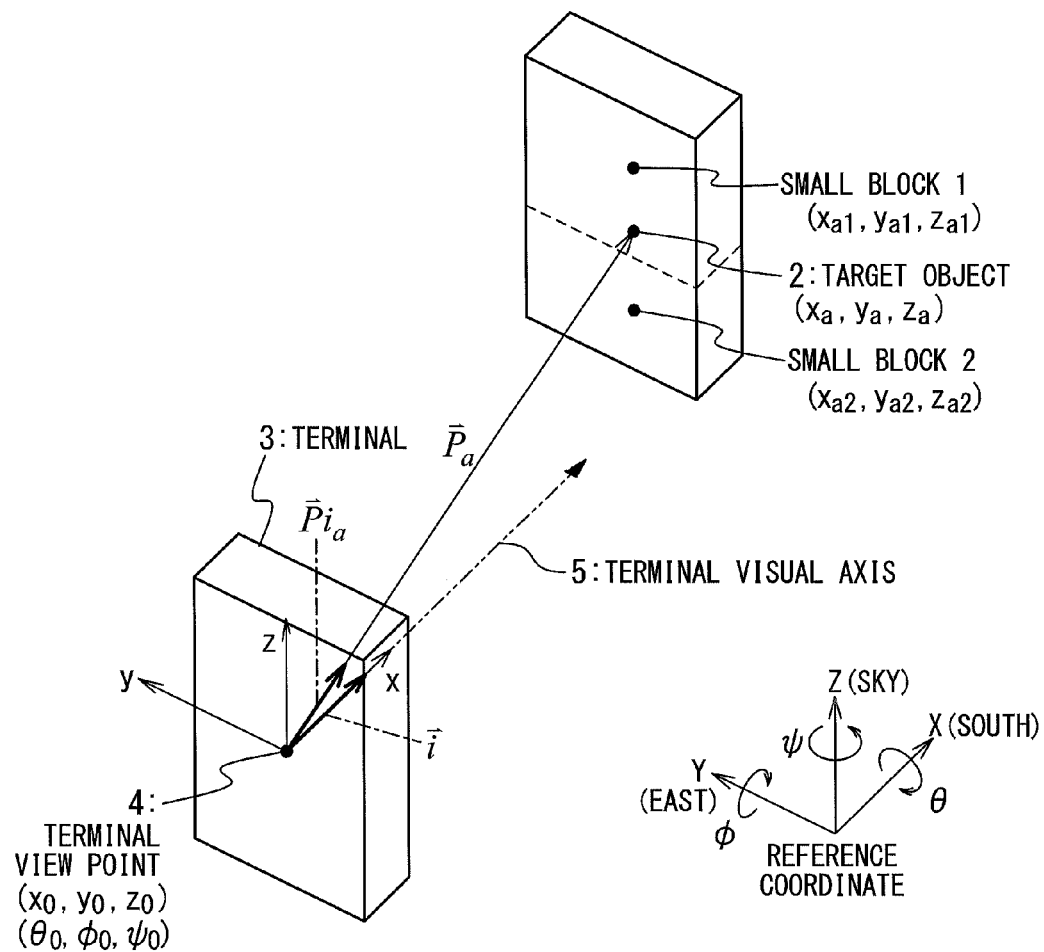
FIG. 4 shows relationships among the target object, a terminal view point 4, and a terminal visual axis 5 in the first exemplary embodiment.

Next, by using FIG. 4, in the operation method of the object identifying system of the present exemplary embodiment, a calculation method for identifying the target object 2 from the candidate object group 111 and a calculation method for identifying the target small block 22 from the candidate small block group 232 are described. In the description, the object group 1 is strictly distinguished from the small block group 222, the candidate object group 111 is strictly distinguished from the candidate small block group 232, and the target object 2 is strictly distinguished from the target small block 22.

FIG. 4 shows the positional relationship between the terminal 3 and the target object 2 in coordinates. In FIG. 4, a reference coordinates (x, y, Z) are shown. In the present exemplary embodiment, the x-axis positive direction is the south, the y-axis positive direction is the east, the z-axis is the altitude, and the z-axis negative direction is a direction toward the ground. An angle of clockwise rotation around the x-axis positive direction is θ (Z=0 and the y-axis positive direction correspond to θ=0 degree), an angle of clockwise rotation around the y-axis positive direction is φ (Z=0 and the x-axis positive direction correspond to φ=0 degree), and an angle of clockwise rotation around the z-axis positive direction is ψ (y=0 and the x-axis positive direction correspond to ψ=0 degrees).

The database of the positional information storage unit 12 of the positional information server 11 records positional information (xa, ya, za) (a is an integer of 1 to N) based on the reference coordinates for each of the N of objects of the object group 1. Additionally, when the inside of each of the N of objects is divided into M of small blocks at maximum, the database of the positional information storage unit 12 records positional information presented by (xab, yab, zab) (b is an integer of 1 to M) based on the reference coordinates for each of the M of small blocks. In FIG. 4, there are a small block 1 (xa1, ya1, za1) and a small block 2 (xa2, ya2, za2) in the target object 2, for example. FIG. 5 shows an example of data of objects and small blocks stored in the database of the positional information storage unit 12. The format of the stored data is not limited to this example.

An output of the position sensor 9 indicates a position (x0, y0, z0) of the terminal 3 based on the reference coordinates. An output of the direction sensor 10 indicates a direction (θ0, φ0, ψ0) of the terminal 3 based on the reference coordinates. When a unit vector of the terminal visual axis 5 is indicated by an equation (1) and an initial value of the unit vector of the terminal visual axis 5 at an initial direction of the terminal 3, (θ0, φ0, ψ0)=(0, 0, 0) is indicated by an equation (2), the unit vector (equation (1)) of the terminal visual axis 5 at a direction of the terminal 3, (θ0, φ0, ψ0) is indicated by an equation (3).

$$\vec{i} = (i_x, i_y, i_z) \tag{1}$$

$$\vec{i} = (1, 0, 0) \tag{2}$$

$$\begin{aligned}\vec{i} &= (i_x, i_y, i_z) \\ &= (1,0,0)\begin{pmatrix} \cos\varphi_0 & \sin\varphi_0 & 0 \\ -\sin\varphi_0 & \cos\varphi_0 & 0 \\ 0 & 0 & 1 \end{pmatrix}\begin{pmatrix} 1 & 0 & 0 \\ 0 & \cos\theta_0 & \sin\theta_0 \\ 0 & -\sin\theta_0 & \cos\theta_0 \end{pmatrix} \\ &\quad \begin{pmatrix} \cos\phi_0 & 0 & -\sin\phi_0 \\ 0 & 1 & 0 \\ \sin\phi_0 & 0 & \cos\phi_0 \end{pmatrix} \\ &= \begin{pmatrix} \cos\varphi_0\cos\phi_0 + \sin\varphi_0\sin\theta_0\sin\phi_0 \\ \sin\varphi_0\cos\theta_0 \\ -\cos\varphi_0\sin\phi_0 + \sin\varphi_0\sin\theta_0\cos\phi_0 \end{pmatrix}^T \end{aligned} \tag{3}$$

Additionally, a position vector from the terminal view point 4 to each of the N of objects is indicated by an equation (4). A unit vector of the equation (4) is indicated by an equation (5). The equation (4) as a position vector is indicated by an equation (6). The equation (5) as a unit vector of that is indicated by an equation (7).

$$\overline{P}_a \tag{4}$$

$$\overline{Pi}_a \tag{5}$$

$$\overline{P}_a(Px_a, Py_a, Pz_a) = (x_a - x_0, y_a - y_0, z_a - z_0) \tag{6}$$

$$\overline{Pi}_a = \left( \frac{Px_a}{\sqrt{Px_a^2 + Py_a^2 + Pz_a^2}}, \frac{Py_a}{\sqrt{Px_a^2 + Py_a^2 + Pz_a^2}}, \frac{Pz_a}{\sqrt{Px_a^2 + Py_a^2 + Pz_a^2}} \right) \tag{7}$$

Next, a position vector from the terminal view point 4 to each of the M of small blocks inside the N of objects is indicated by an equation (8). The unit vector of the equation (8) is indicated by an equation (9). The equation (8) as a position vector is indicated by an equation (10). The equation (9) as a unit vector of that is indicated by an equation (11).

$$\overline{P}_{ab} \tag{8}$$

$$\overline{Pi}_{ab} \tag{9}$$

$$\overline{P}_{ab} = (Px_{ab}, Py_{ab}, Pz_{ab}) = (x_{ab} - x_0, y_{ab} - y_0, z_{ab} - z_0) \tag{10}$$

$$\overline{Pi}_{ab} = \left( \frac{Px_{ab}}{\sqrt{Px_{ab}^2 + Py_{ab}^2 + Pz_{ab}^2}}, \frac{Py_{ab}}{\sqrt{Px_{ab}^2 + Py_{ab}^2 + Pz_{ab}^2}}, \frac{Pz_{ab}}{\sqrt{Px_{ab}^2 + Py_{ab}^2 + Pz_{ab}^2}} \right) \tag{11}$$

The identifying unit 7 calculates the following equation (12) by using the above-mentioned equation (3) and equation (7) in order to identify the target object 2. The identifying unit 7 performs the calculation for the all N of objects a as the candidate object group 111.

$$\left| \frac{Px_a}{\sqrt{Px_a^2 + Py_a^2 + Pz_a^2}} - i_x \right| + \left| \frac{Py_a}{\sqrt{Px_a^2 + Py_a^2 + Pz_a^2}} - i_y \right| + \left| \frac{Pz_a}{\sqrt{Px_a^2 + Py_a^2 + Pz_a^2}} - i_z \right| \tag{12}$$

The equation (12) indicates a degree of coincidence between the terminal visual axis 5 of the terminal 3 and a visual axis from the terminal view point 4 toward each object a of the candidate object group 111. When a solution of the equation (12) is 0, the both visual axes coincide with each other. When there is no object a for which a solution of the equation (12) is 0, an object a for which a solution of the equation (12) is closest to 0 provides the highest degree of coincidence between the visible axes. In the present invention, the identifying unit 7 determines an object a, for which a solution of the equation (12) is 0, as the target object 2 to be identified but determines an object a, for which a solution of the equation (12) is closest to 0, as the target object 2 when there is no object for which a solution of the equation (12) is 0. Additionally, when there are plurality of objects a for which a solution of the equation (12) is 0 or there are plurality of objects a for which a solution of the equation (12) is closest to 0, the identifying unit 7 determines an object a of the plurality of objects a, for which an absolute value of the equation (6) as a distance from the terminal 3 is smallest, as the target object 2 to be identified.

Furthermore, the identifying unit 7 calculates the following equation (13) by using the above-mentioned equation (3) and equation (11) in order to identify the target small block 22. The identifying unit 7 performs the calculation for the all n×m of small blocks as the candidate small block group 232. When b=0, the identifying unit 7 does not perform the calculation since there is no small block in the object a.

$$\left| \frac{Px_{ab}}{\sqrt{Px_{ab}^2 + Py_{ab}^2 + Pz_{ab}^2}} - i_x \right| + \qquad (13)$$
$$\left| \frac{Py_{ab}}{\sqrt{Px_{ab}^2 + Py_{ab}^2 + Pz_{ab}^2}} - i_y \right| + \left| \frac{Pz_{ab}}{\sqrt{Px_{ab}^2 + Py_{ab}^2 + Pz_{ab}^2}} - i_z \right|$$

The equation (13) indicates a degree of coincidence between the terminal visual axis 5 of the terminal 3 and a visual axis from the terminal view point 4 toward each small block ab of the candidate small block group 232. When a solution of the equation (13) is 0, the both visual axis coincide with each other. When there is no small block ab for which a solution of the equation (13) is 0, a small block ab for which a solution of the equation (13) is closest to 0 provides the highest degree of coincidence between the visible axes. In the present invention, the identifying unit 7 determines a small block ab, for which a solution of the equation (13) is 0, as the target small block 22 to be identified but determines a small block ab, for which a solution of the equation (13) is closest to 0, as the target small block 22 when there is no small block for which a solution of the equation (13) is 0. Additionally, when there are plurality of small blocks ab for which a solution of the equation (13) is 0 or there are plurality of small blocks ab for which a solution of the equation (13) is closest to 0, the identifying unit 7 determines a small block ab of the plurality of small blocks ab, for which an absolute value of the equation (10) as a distance from the terminal 3 is smallest, as the target small block 22 to be identified.

In the above method, there is a case where a of the target object 2 is different from a of the target small block 22. In this case, the identifying unit 7 compares closeness between visible axes for the target object 2 obtained from the equation (12) with closeness between visible axes for the target small block 22 obtained from the equation (13). That is to say, the identifying unit 7 compares which of a solution of the equation (12) and a solution of the equation (13) is closer to 0.

In a case of "closeness between visible axes for the target object 2>closeness between visible axes for the target small block 22", i.e. when a solution of the equation (13) for obtaining the target small block 22 is closer to 0 than a solution of the equation (12) for obtaining the target object 2, the identifying unit 7 determines the target small block 22 as a solution to be obtained.

In a case of "closeness between visible axes for the target object 2<closeness between visible axes for the target small block 22", i.e. when a solution of the equation (12) for obtaining the target object 2 is closer to 0 than a solution of the equation (13) for obtaining the target small block 22, the identifying unit 7 determines the target object 2 as a solution to be obtained.

Additionally, the calculation method may be a method in which an object a is identified at first and a small block ab included in the object is identified thereafter. Consequently, it is possible to reduce the number of times of calculation for small blocks ab, the number of which is greater than the number of objects.

The above is the descriptions of the calculation methods for identifying the target object 2 and the target small block 22 by the object identifying system. In accordance with the calculation methods, the object identifying system can identify the target object 2 or the target small block 22 designated by the user.

Hereinafter, when not particularly specified, the object group 1 includes the small block group 222, the candidate object group 111 includes the candidate small block group 232, the object includes the small block, and a case is included in which the target object 2 is the target small block 22.

[Description of Modification Examples of the Object Identifying System]

Next, as a first modification example of the first exemplary embodiment, a case in which stereo information is used as the positional information of the object is described. In the present exemplary embodiment, the identifying unit 7 identifies the target object 2 based on only coordinates set for a single point in the object. The identifying unit 7 may perform identification by using stereo information of the object.

In this case, the positional information storage unit 12 of the positional information server 11 records a cubic building as cubic information including apex-coordinates of eight apexes. Additionally, the positional information storage unit 12 records, for each of the eight apex-coordinates, other apex coordinates connected to the apex coordinate. Consequently, the cubic building can be identified as a region surrounded by the eight apex-coordinates. The positional information storage unit 12 of the positional information server 11 stores, for every object, eight apex-coordinates and connection relationship among the apex-coordinates in the database as positional information related to the object group 1. The identifying unit 7 extracts objects from the object group 1, for which the terminal visual axis 5 extends through the stereo information, as the candidate object group 111. The identifying unit 7 identifies as the target object 2, an object closest to the terminal view point 4 in the candidate object group 111 thus extracted.

Next, as a second modification example of the first exemplary embodiment, a case is described in which object is identified by the positional information server 11. In the present exemplary embodiment, the identifying unit 7 of the terminal 3 performs calculation for identifying the target object 2. This calculation may be performed by the positional information server 11. In this case, the positional information server 11 is additionally provided with an identifying unit (not shown) of the positional information server 11 for performing the same processing as the identifying unit 7 of the terminal 3. The identifying unit 7 transmits an object identification request in place of the candidate object extraction request to the positional information server 11. The identifying unit 7 transmits the object identification request including the positional information of the terminal 3 and the directional information of the terminal 3 to the identifying unit of the positional information server 11. Accordingly, any of the terminal 3 and the positional information server 11 can identify the target object 2.

Next, as a third modification example of the first exemplary embodiment, a modification example of the visual axis setting method is described. In the present exemplary embodiment, the user designates the target object 2 by using the terminal visual axis 5. The user may designate the target object 2 by using a user visual axis 55 in place of the terminal visual axis 5, which is set based on a user view point 44 and the terminal view point 4.

Figure 6:
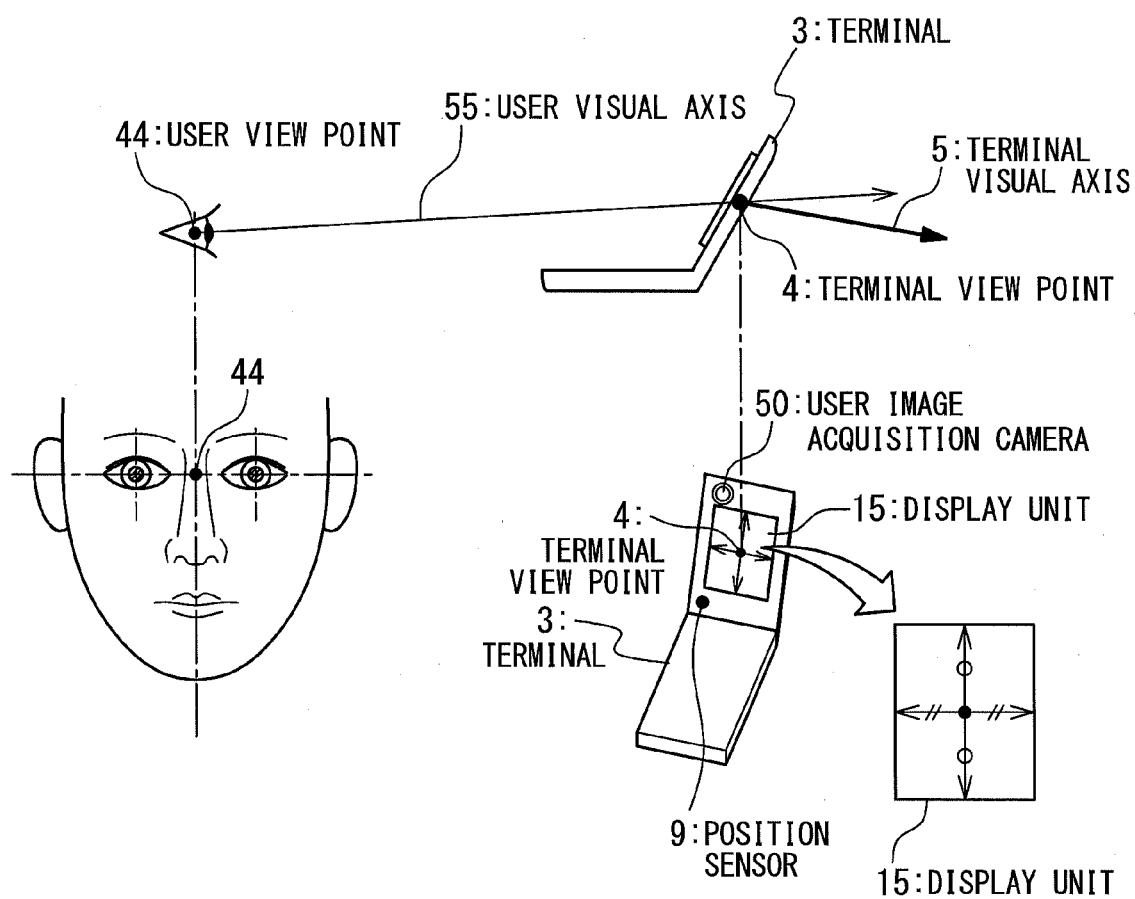
FIG. 6 is a conceptual diagram of a user view point 44 and a user visual axis 55 in a third modification example of the first exemplary embodiment.

FIG. 6 shows a conceptual diagram of the user view point 44 and the user visual axis 55. In this case, the terminal 3 includes a user image acquisition camera 50 on the same side as the display unit 15 of the terminal 3, i.e. the side that faces the user. The center point of the display unit 15 of the terminal 3 serves as the terminal view point 4. The center point of a line connecting the both eyes of the user serves as the user view point 44. Furthermore, extension of a straight line connecting the user view point 44 and the terminal view point 4 serves as the user visual axis 55. The user designates the target object 2 by using the user visual axis 55.

The user, in advance, takes an image of the face of the user by using the user image acquisition camera 50 from a position away from the terminal 3 by a predetermined constant distance. The terminal 3 detects the face of the user and the both eyes of the user from the image of the face of the user. The terminal 3 stores a size of the detected face and data of the both eyes of the user in the identifying unit 7. The image of the face of the user detected from the image is the size of the face of the user at the position away from the terminal 3 by the constant distance. The terminal 3 detects a distance between the user view point 44 and the terminal view, point 4 by using the size of the face as a reference. Furthermore, the terminal 3 sets the user view point 44 at the center point between the both eyes based on the image of the both eyes detected from the image. In detecting the user view point 44, the terminal 3 corrects an error between positions of the position sensor 9 of the terminal 3 and the terminal view point 4, and an error between positions of the position sensor 9 of the terminal 3 and the user image acquisition camera 50.

The user designates the target object 2 by using the user visual axis 55 which extends into the back of the display unit 15 of the terminal 3 in a state that the user looks into the terminal view point 4 at the center point of the display unit 15 from the user view point 44 between the both eyes. That is to say, the user designates the target object 2 by using the user visual axis 55 as the extension of the line which connects the user view point 44 set between the both eyes of the user and the terminal view point 4 set at the center point of the display unit 15 of the terminal 3 and extends into the back of the display unit 15. The terminal 3 sets the user view point 44 based on the image taken by the user image acquisition camera 50, and sets the user visual axis 55 based on the line connecting the set user view point 44 and the terminal view point 4.

When being notified of the object identification instruction of the user from the input unit 6, the identifying unit 7 acquires the positional information of the terminal 3 from the position sensor 9. The identifying unit 7 sets the terminal view point 4 based on the positional information of the terminal 3 and an error between positions of the position sensor 9 and the center point of the display unit 15. The identifying unit 7 detects the face and the both eyes from the image of the face of the user taken by the user image acquisition camera 50. The identifying unit 7 sets the user view point 44 based on the detected positions of the both eyes, the size of the face of the user, the registered size of the face of the user, the positional information of the terminal 3 from the position sensor 9, and the error between positions of the position sensor 9 and the user image acquisition camera 50. The identifying unit 7 sets the user visual axis 55 based on the set user view point 44 and the terminal view point 4.

As mentioned above, by using the user view point 44 and the user visual axis 55, the user can designate the target objet 2 in a way close to the sense of the user. Since the user designates the target object 2 through the display unit 15 of the terminal 3, the user can more strongly feel the sense of see-through.

The above is the description of the object identifying system. In the following description, the operation method of the object identifying system for identifying the target object 2 is the same unless particularly specified.

[Description of a Configuration of the Object Information Presenting System]

Next, the object information presenting system according to the present exemplary embodiment is described. When not particularly specified in the following description, the object group 1 includes the small block group 222, the candidate object group 111 includes the candidate small block group 232, the object includes the small block, and a case is included in which the target object 2 is the target small block 22. Additionally, in the following description, the first to third modification examples of the first exemplary embodiment are all included.

Figure 7:
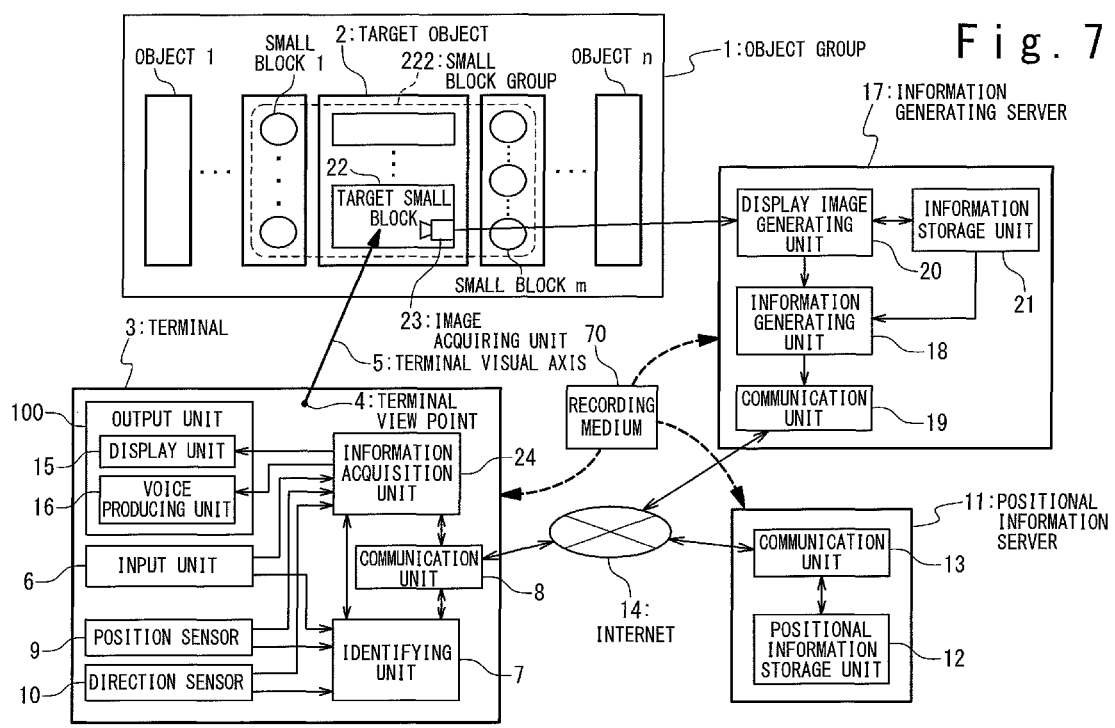
FIG. 7 shows a configuration of an object information presenting system according to the first exemplary embodiment.

FIG. 7 shows a configuration of the object information presenting system. In the present exemplary embodiment, the object information presenting system further includes information generating servers 17 in addition to the object group 1, the terminal 3, the positional information server 11, and the Internet 14 included in the object identifying system in FIG. 1.

First, the object group 1 is described. The object group 1 respectively further includes an image acquiring unit 23 in the inside. The image acquiring unit 23 is connected to a display image generating unit 20 of the information generating server 17 by using wired communication or wireless communication. The image acquiring unit 23 includes an image acquisition camera and acquires an internal image of the object. The image acquiring unit 23 transmits the acquired internal image of the object to the image generating unit 20. The image acquiring unit 23 and the image acquisition camera may be integrally configured or may be installed separately. When the image acquiring unit 23 and the image acquisition camera are installed separately, those are connected by using wired communication or wireless communication.

Next, the terminal 3 is described. The terminal 3 further includes an information acquiring unit 24 and an output unit 100 in addition to the input unit 6, the position sensor 9, the direction sensor 10, the communication unit 8, and the identifying unit 7.

The input unit 6 further includes input means for operation mentioned later, such as selection of information outputted to the output unit 100. The communication unit 8 is a communication module of a portable phone for example. In this case, the communication unit 8 includes a wireless communication unit, carries out wireless communication, can communicate with the positional information server 11 through a network such as the Internet 14, and can communicate with the information generating server 17.

The identifying unit 7 identifies the target object 2 in accordance with the operation method, as mentioned above. In addition, the identifying unit 7 further acquires an IP (Internet Protocol) address of the information generating server 17 holding information of the identified target object 2 from the positional information storage unit 12 of the positional information server 11, and notifies the information acquiring unit 24 of the acquired IP address of the information generating server 17.

The information acquiring unit 24 acquires an internal image of the target object 2 identified by the identifying unit 7, from the information generating server 17. The information acquiring unit 24 accesses the information generating server 17 holding the information of the target object 2 identified by the identifying unit 7 through the communication unit 8 based on the IP address notified from the identifying unit 7. The information acquiring unit 24 acquires the internal image of the target object 2 from the accessed information generating server 17. The information acquiring unit 24 outputs the internal image of the target object 2 to the output unit 100.

The output unit 100 outputs the image which is acquired by the information acquiring unit 24 from the information generating server 17. The output unit 100 includes a display unit 15 and a voice producing unit 16. The display unit 15 is an LCD (Liquid Crystal Display) monitor for example. The display unit 5 displays image information or the internal image inputted from the information acquiring unit 24. The voice producing unit 16 is a speaker for example. The voice producing unit 16 outputs voice information inputted from the information acquiring unit 24. When not especially specified in the following description, output to the output unit 100 includes output to the display unit 15, output to the voice producing unit 16, or output to the both.

Next, the positional information server 11 is described. The positional information server 11 includes the positional information storage unit 12 and the communication unit 13. The positional information storage unit 12 further stores in the database, in addition to the above-mentioned three dimensional positional information of the object group 1, IP addresses of the information generating servers 17 respectively corresponding to the objects such that the IP addresses are respectively correlated to the objects.

FIG. 8 shows an example of data of objects and small blocks stored in the database of the positional information storage unit 12. Note that the format of the stored data is not limited to this example. The positional information storage unit 12, in response to a request from the identifying unit 7 of the terminal 3, retrieves the three-dimensional positional information of the object group 1 stored in the database to extract the positional information of the candidate object group 111. Furthermore, the positional information storage unit 12, in response to a request from the identifying unit 7 of the terminal 3, extracts an IP address that corresponds to the information generating server 17 holding information of the target object 2. The positional information storage unit 12 transmits the extracted positional information of the candidate object 111 and the IP address of the information generating server 17 to the identifying unit 7 of the terminal 3 through the communication unit 13.

Next, the information generating server 18 is described. The information generating server 17 transmits the internal image of the target object 2 to the terminal 3. In the present exemplary embodiment, the information generating servers 17 are installed in respectively correspondence to the N of the object group 1 and the M of the small block group 222 as parts thereof. The information generating server 17 includes the display image generating unit 20, an information storage unit 21, an information generating unit 18, and a communication unit 19.

The display image generating unit 20 generates a display image which is to be transmitted to the terminal 3, based on the internal image of the target object 2. The display image generating unit 20 receives the internal image transmitted by the image acquiring unit 23 installed in the target object 2. The display image generating unit 20 generates the display image which is to be transmitted to the terminal 3, based on the received internal image, in response to a request from the information generating unit 18. The display image generating unit 20 outputs the generated display image to the information generating unit 18.

The information storage unit 21 stores in the database, information related to the target object 2, which is mentioned later. The information storage unit 21 extracts the information related to the target object 2 from the database in response to a request from the information generating unit 18. The information storage unit 21 outputs to the information generating unit 18, the extracted information related to the target object 2.

The information generating unit 18 accepts a request from the information acquiring unit 24 of the terminal 3 and makes a response in response to the request. The information generating unit 18 receives a request from the information acquiring unit 24 of the terminal 3 through the communication unit 19. The information generating unit 18 orders the display image generating unit 20 to generate a display image, in response to the received request. Alternatively, the information generating unit 18 orders the information storage unit 21 to extract information. The information generating unit 18 transmits the display image outputted by the display image generating unit 20 or the related information outputted by the information storage unit 21, to the information acquiring unit 24 of the terminal 3 through the communication unit 19.

The communication unit 19 can communicate with the terminal 3 through the Internet 14.

The terminal 3, the positional information server 11, and the information generating server 17 are connected through the Internet 14 by using the communication unit 8 of the terminal 3, the communication unit 13 of the positional information server 11, and the communication unit 19 of the information generating server 17, and can communicate with each other.

Additionally, functions of the terminal 3, the positional information server 11, and the information generating server 17 are implemented by a CPU, a hard disk, a ROM, a RAM and the like (not shown). Functions of the terminal 3, the positional information server 11, and the information generating server 17 are implemented by software. The recording medium 70 records a program for implementing the function of the information generating server 17 in addition to the functions of the terminal 3 and the positional information server 11. When the functions of the terminal 3, the positional information server 11, the information generating server 17 are implemented by software, the terminal 3, the positional information server 11, and the information generating server 17 are implemented by introducing the program recorded in the recording medium 70 into the terminal 3, the positional information server 11, and the information generating server 17. Note that the functions of the terminal 3, the positional information server 11, and the information generating server 17 can be implemented by hardware. The above is the description of the configuration of the object information presenting system according to the present exemplary embodiment.

[Description of Operation of the Object Information Presenting System]

Figure 9B:
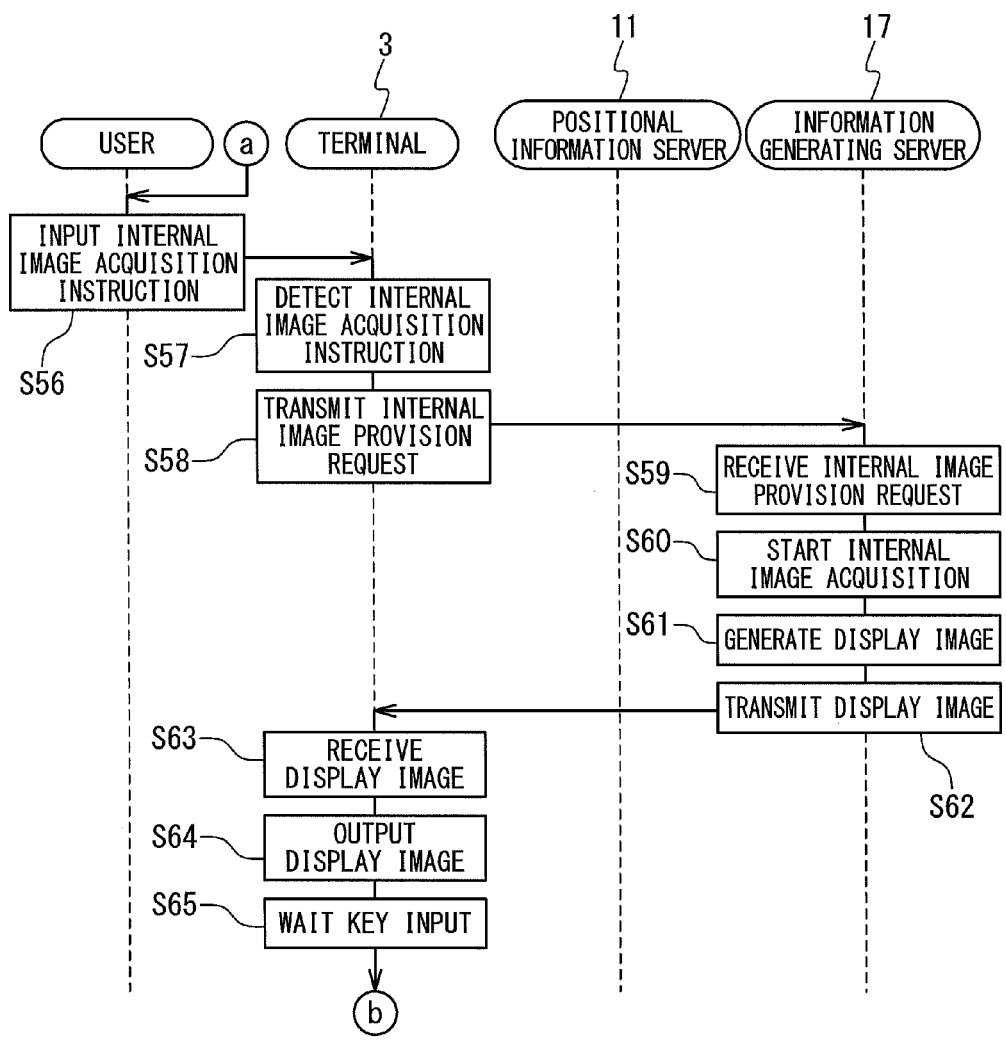
FIG. 9B is an operational flow of the object information presenting system according to the first exemplary embodiment.

Next, an operation method of the object information presenting system according to the present exemplary embodiment is described. FIG. 9A and FIG. 9B show the operation method of the object information presenting system.

First, the terminal 3 is in a state of waiting for input of a target object identification instruction from the user (S40). The user designates the target object 2 in the object group 1 by using the terminal visual axis 5 of the terminal 3 (S41). The user, while keeping designating the target object 2 with the terminal visual axis 5, inputs the target object identification instruction through the input unit 6 of the terminal 3 (S42). The object identifying system identifies the target small block 22 in accordance with the above-mentioned operation method (S3 to S12 in FIG. 2) (S43). In order to acquire an IP address of the information generating server 17 that corresponds to the identified target object 2, the identifying unit 7 of the terminal 3 transmits an IP address notification request including the positional information of the target object 2 to the positional information server 11 through the communication unit 8 (S44). The positional information storage unit 12 of the positional information server 11 receives the IP address notification request through the communication unit 13 (S45). The positional information storage unit 12 extracts, based on the positional information of the target object 2, an IP address of the information generating server 17 that corresponds to the positional information of the target object 2 from the database (S46). The positional information storage unit 12 transmits the IP address of the information generating server 17 to the identifying unit 7 of the terminal 3 through the communication unit 13 (S47). The identifying unit 7 of the terminal 3 receives the IP address of the information generating server 17 through the communication unit 8 (S48). The identifying unit 7 notifies the information acquiring unit 24 of the IP address of the information generating server 17. The information acquiring unit 24 transmits, based on the IP address of the information generating server 17, a object information list presentation request for the target object 2 to the information generating unit 18 of the information generating server 17 through the communication unit 8 (S49). The information generating unit 18 of the information generating server 17 receives the object information list presentation request through the communication unit 19 (S50). The information generating unit 18 orders presentation of the object information list stored in the database of the information storage unit 21. The information storage unit 21 extracts the object information list from the database and responds to the information generating unit 18. The information generating unit 18 inputs the object information list (S51). The information generating unit 18 transmits the object information list to the information acquiring unit 24 of the terminal 3 through the communication unit 19 (S52). The information acquiring unit 24 of the terminal 3 receives the object information list through the communication unit 8 (S53). The information acquiring unit 24 outputs the object information list to the output unit 100 (S54). The terminal 3 is changed into a state of waiting for key input from the user (S55).

The user selects a preferred information item ("acquire internal image" as a mode for displaying internal image is supposed to be selected in this case) from the object information list outputted to the output unit 100, and inputs the information item through the input unit 6 of the terminal 3 (S56). The input unit 6 detects the input of the internal image acquisition request by the user and notifies the detection to the information acquiring unit 24 (S57). When being notified of the detection of the internal image acquisition request, the information acquiring unit 24 transmits an internal image provision request to the information generating unit 18 of the information generating server 17 through the communication unit 8 (S58). The information generating unit 18 of the information generating server 17 receives the internal image provision request through the communication unit 19 (S59). The information generating unit 18 orders the display image generating unit 20 to generate an internal image. The display image generating unit 20 starts acquisition of an internal image from the image acquisition camera of the image acquiring unit 23 installed in the target object 2 (S60). The display image generating unit 20 generates a display image from the internal image. The display image generating unit 23 outputs the display image to the information generating unit 18 (S61). The information generating unit 18 transmits the display image inputted from the display image generating unit 20, to the information acquiring unit 24 of the terminal 3 through the communication unit 19 (S62). The information acquiring unit 24 of the terminal 3 receives the display image of the target object 2 through the communication unit 8 (S63). The information acquiring unit 24 outputs the display image to the output unit 100 (S64). The information generating unit 18 is changed into a state of waiting for key input (S65).

Here, the above-mentioned object information list outputted by the information storage unit 21 of the information generating server 17 is a display screen through which the user selects demanded information. Items which can be selected in the object information list includes, for example, "acquire advertisement information" as a mode for presenting information related to the object, "terminate information presentation mode" for terminating an information presentation mode, and "identify another object" for identifying another object, in addition to the above-mentioned "acquire internal image".

When the target small block 22 is a restaurant for example, advertisement information which can be obtained through "acquire advertisement information" is considered to be such information as a discount coupon, a menu list, a promotional video and word-of-mouth information of the restaurant. The information is stored in the information storage unit 21 of the information generating server 17 in advance as text data, voice data, or image data.

In the object information list, a number may be assigned to every item in advance, for example. When the user inputs an item number that corresponds to an item of the object information list through the input unit 6, the input unit 6 detects the input by the user and notifies the information acquiring unit 24 of the input detection together with the item number. The information acquiring unit 24 transmits a process request together with the item number notified from the input unit 6 to the information generating server 17.

Figure 10A:
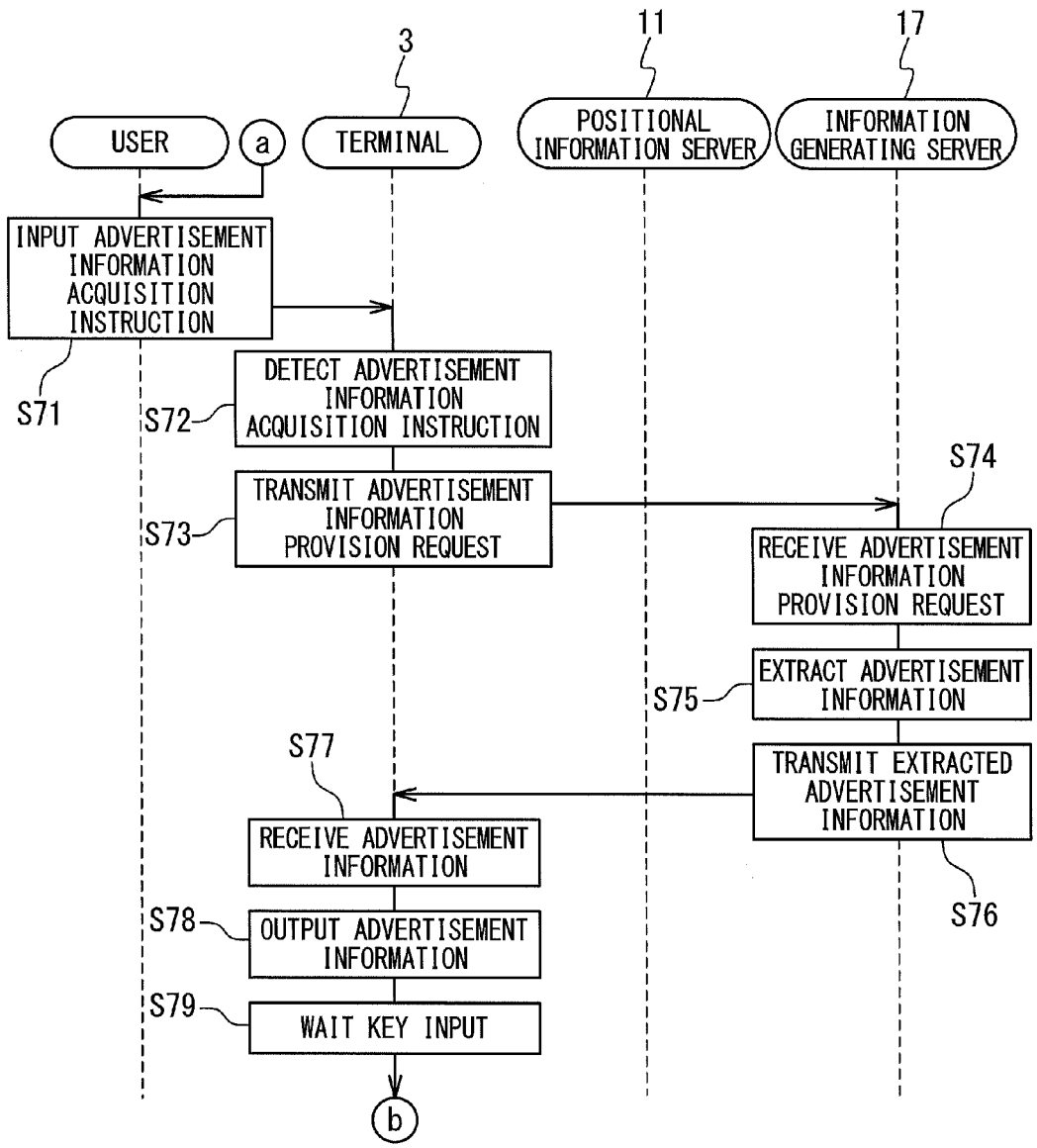
FIG. 10A is an operational flow of the object information presenting system according to the first exemplary embodiment in a case that "acquire advertisement information" is selected from an object information list.

Next, by using FIG. 10A, FIG. 10B, and FIG. 10C, respective operation methods are described in a case that the user selects "acquire advertisement information" from the object information list outputted to the output unit 100 of the terminal 3, in a case that the user selects "terminate information presentation mode", and in a case that the user selects "identify another object".

First, an operation method is described in a case that the user selects "acquire advertisement information" from the object information list. FIG. 10A shows the operation method in a case that "acquisition of advertisement information" is selected.

As mentioned above, the terminal 3 has been changed into a state of waiting for key input from the user (S55). The user selects "acquire advertisement information" from the object information list outputted to the output unit 100 of the terminal 3 and inputs "acquire advertisement information" to the input unit 6 (S71). The input unit 6 detects the advertisement information acquisition instruction and notifies the detection to the information acquiring unit 24 (S72). When receiving the notification of the detection of the advertisement information acquisition instruction from the input unit 6, the information acquiring unit 24 transmits a advertisement information presentation request to the information generating unit 18 of the information generating server 17 through the communication unit 8 (S73). The information generating unit 18 of the information generating server 17 receives the advertisement information presentation request through the communication unit 19 (S74). The information generating unit 18 orders the information storage unit 21 to extract advertisement information. The information storage unit 21 extracts the stored advertisement information and responds to the information generating unit 18 (S75). The information generating unit 18 transmits the advertisement information to the information acquiring unit 24 of the terminal 3 through the communication unit 19 (S76). The information acquiring unit 24 of the terminal 3 receives the advertisement information through the communication unit 8 (S77). The information generating unit 18 outputs the received advertisement information to the output unit 100 (S78). The information generating unit 18 is changed into a state of waiting for key input (S79).

Next, an operation method is described in a case that the user selects "terminate information presentation mode" from the object information list. FIG. 10B shows the operation method in the case that "terminate information presentation mode" is selected.

As mentioned above, the terminal 3 has been changed into a state of waiting for key input from the user (S55). The user selects "terminate information presentation mode" from the object information list outputted to the output unit 100 of the terminal 3 and inputs "terminate information presentation mode" to the input unit 6 (S81). The input unit 6 detects the information presentation mode termination instruction and notifies the detection to the information acquiring unit 24 (S82). When receiving the notification of the detection of the information presentation mode termination instruction from the input unit 6, the information acquiring unit 24 transmits an information presentation stop request to the information generating unit 18 of the information generating server 17 through the communication unit 8 (S83). The information generating unit 18 of the information generating server 17 receives the information presentation stop request through the communication unit 19 (S84). If the advertisement information or the internal image is in the middle of transmission, the information generating unit 18 stops the transmission (S85). The information generating unit 18 transmits an information presentation stop response to the information acquiring unit 24 of the terminal 3 through the communication unit 19 (S86). The information acquiring unit 24 of the terminal 3 receives the information presentation stop response through the communication unit 8 (S87). The information acquiring unit 24 is changed into a state of waiting for input from the user to the input unit 6 (S40).

Next, an operation method is described in a case that the user selects "identify another object" from the object information list. FIG. 10C shows the operation method in the case that "identify another object" is selected.

As mentioned above, the terminal 3 has been changed into a state of waiting for key input from the user (S55). The user selects "identify another object" from an object information list outputted to the output unit 100 of the terminal 3 and inputs "identify another object" to the input unit 6 (S91). The input unit 6 detects the another object identification instruction and notifies the detection to the information acquiring unit 24 (S92). When receiving the notification of the detection of the another object identification instruction from the input unit 6, the information acquiring unit 24 transmits an information presentation stop request to the information generating unit 18 of the information generating server 17 through the communication unit 8 (S93). The information generating unit 18 of the information generating server 17 receives the information stop request through the communication unit 19 (S94). If the advertisement information or the internal image is in the middle of transmission, the information generating unit 18 stops the transmission of the information (S95). The information generating unit 18 transmits an information presentation stop response to the information acquiring unit 24 of the terminal 3 through the communication unit 19 (S96). The information acquiring unit 24 of the terminal 3 receives the information presentation stop response through the communication unit 8 (S97). In order to urge the user to instruct an object identification, the information acquiring unit 24 outputs such guidance indication as "select another object and input key" for example, to the output unit 100 (S98). The terminal 3 is changed into a state of waiting for input of the object identification instruction from the user to the input unit 6 (S40). The user checks the guidance indication outputted to the output unit 100 (S99). The user newly designates the target object 2 by using the terminal visual axis 5 (S100). When the user inputs a target object identification instruction to the input unit 6, the object identification system begins the above-mentioned object identifying operation. Thereafter, the operation returns to (S41).

The above is the respective operation methods in the case that the user selects "acquire advertisement information" from the object information list outputted at the output unit 100 of the terminal 3, in the case that the user selects "terminate information presentation mode", and in the case that the user selects "identify another object".

Next, description is given on a case in which the user performs "input of any key" to the input unit 6 during the time when the information acquiring unit 24 outputs information such as the internal image and the advertisement information to the output unit 100 of the terminal 3 (S65 and S79). When the user presses any key of the input unit 6, output of the output unit 100 is changed from the internal image or the advertisement information to the object information list. The user can select items from the object information list which is newly outputted to the output unit 100. FIG. 11 shows an operation method when the user performs "input of any key" to the input unit 6 during the output of information to the output unit 100.

The terminal 3 has been changed into a state of waiting for key input from the user. The user inputs any key of the input unit 6 (S111). The input unit 6 detects the key input (S112). The input unit 6 notifies the information acquiring unit 24 of the detection of the key input. When receiving the notification of the detection of the key input from the input unit 6, the information acquiring unit 24 transmits an object information list presentation request to the information generating unit 18 of the information generating server 17 through the communication unit 8 (S113). The information generating unit 18 of the information generating server 17 receives the object information list presentation request through the communication unit 19 (S114). The information generating unit 18 stops information in the middle of transmission (S115). The information generating unit 18 orders the information storage unit 21 to present the object information list. The information storage unit 21 extracts the object information list from the database (S116). The information storage unit 21 responds to the information generating unit 18 by transmitting the extracted object information list. The information generating unit 18 transmits the object information list acquired from the information storage unit 21 to the information acquiring unit 24 of the terminal 3 through the communication unit 19

(S117). The information acquiring unit 24 of the terminal 3 receives the object information list through the communication unit 8 (S118). The information acquiring unit 24 outputs the object information list to the output unit 100 (S119). After that, the terminal 3 is changed into a state of waiting for key input (S55).

The above is the operation method when the user inputs any key of the input unit 6 during the output of information to the output unit 100.

Next, as for the above-mentioned operation methods of the object information presenting system according to the present exemplary embodiment shown in FIG. 9A to FIG. 11, FIG. 12 shows an overview of the operation methods based on the connection relationship among the operation methods. This can make it possible to grasp the overview of the operation method of the image providing system including the object identifying system and the object information presenting system.

The above is the description of the operation methods of the object information presenting system according to the present exemplary embodiment. The operation methods make it possible for the user to check the internal image of the target object 2 at the output unit 100 of the terminal 3.

[Description of Other Functions of the Object Information System]

In the present exemplary embodiment, the information generating unit 18 obtains access logs. The access logs relate to information such as information about when and which user performs access or information about what is selected from the object information list by the user. The access logs obtained by the information generating server 17 are stored in the information storage unit 21. Concerned parties of the target object 2 can check interests and behaviors of users by viewing and summing up the access logs stored in the information storage unit 21.

In the present exemplary embodiment, the case has been described in which the single terminal 3 is used. However, it is considered that plurality of users identify different objects and request information presentation of the objects at the same time by using different terminals 3. Additionally, it is considered that plurality of users identify different objects and request information presentation of the objects at arbitrary times by using different terminals 3. The image providing system of the present invention is also effective in these cases. In this case, a plurality of terminals 3 access the positional information server 11 at the same time. The positional information server 11 realizes simultaneous access through time sharing in which accesses from the terminals 3 are respectively processed at a constant time interval.

Additionally, in the present exemplary embodiment, it is considered that plurality of users identify the same object and request information presentation of the object at the same time by using different terminals 3. It is also considered that plurality of users identify the same object and request information presentation of the object at arbitrary times by using different terminals 3. The image providing system of the present invention is also effective in these cases. In this case, it is considered that a plurality of terminals 3 access the positional information server 11 and the information generating server 17 that corresponds to the same object at the same time. The positional information server 11 and the information generating server 17 realize simultaneous access through time sharing in which accesses from the terminals 3 are respectively processed at a constant time interval.

The above is the description of the object information presenting system according to the present exemplary embodiment. Modification examples of the present exemplary embodiment are described below.

[Description of Modification Examples of the Object Information Presenting System]

Next, as for a fourth modification example of the first exemplary embodiment, a case is described in which URLs (Uniform Resource Locator) are used as retrieval information of the information generating server 17.

In the present exemplary embodiment, the positional information storage unit 12 of the positional information server 11 stores IP addresses correlated to respective objects in the database, as retrieval information of the information generating servers 17. The retrieval information may be stored in the URL format. In this case, URLs and IP addresses can be connected by newly installing a DNS (Domain Name System) server (not shown).

Next, as a fifth modification example of the first exemplary embodiment, a case is described in which the information generating servers 17 are collectively installed. In the present exemplary embodiment, the information generating servers 17 are installed in respective objects of the object group 1. For example, the servers may be collectively installed in such a data center as an IDC (Internet Data Center).

In this case, the information generating server 17 stores information that corresponds to a plurality of target objects 2. The information generating server 17 corresponds to the image acquiring units 23 in a plurality of objects and is connected to the image acquiring units 23 in the plurality of objects. The image acquiring unit 23 further includes a communication unit (not shown) of the image acquiring unit 23. The communication unit of the image acquiring unit 23 communicates with the communication unit 19 of the information generating server 17 through such a network as the Internet 14. The information storage unit 21 of the information generating server 17 further stores IP address of the image acquiring unit 23 in the database.

In order to notify the information generating unit 18 of the information generating server 17 of information about image of which object is requested, the information acquiring unit 24 of the terminal 3 transmits an internal image presentation request including such identification information as an object ID. When receiving the internal image presentation request from the information acquiring unit 24, the information generating unit 18 orders the display image generating unit 20 to start image acquisition of an object designated by the object ID. The display image generating unit 20 acquires an IP address of the image acquiring unit 23 from the information storage unit 21 and acquires an internal image from the image acquiring unit 23 through the communication unit 19.

Next, as a sixth modification example of the first exemplary embodiment, a case is described in which an external image of the target object 2 is used as a display image. In the present exemplary embodiment, the display image outputted to the output unit 100 of the terminal 3 is the internal image of the target object 2. This display image may be an external image as an image which is acquired by taking image of external surroundings from the target object 2.

In this case, the image acquisition camera of the image acquiring unit 23 is installed at a position from which the outside of the target object 2 can be seen. The image acquisition camera of the image acquiring unit 23 acquires an external image as an image which is acquired by taking image of external surroundings of the target object 2 from the target object 2. The display image generating unit 20 generates a display image from the acquired external image. Therefore, when there is a building in front of the user, the user can see an image of the opposite side of the building in the external image. When the target small block 22 is positioned at a high place such as a gazebo for example, the user can see perspective images in respective directions from the position of the target small block 22 through instructions from the terminal 3 by installing image acquisition cameras to be directed to in the respective directions of the gazebo and applying second to fourth exemplary embodiments mentioned later.

Next, as a seventh modification example of the first exemplary embodiment, a case is described in which a stored image is used as a display image. In the present exemplary embodiment, a display image outputted to the output unit 100 of the terminal 3 is a real-time image acquired by the image acquisition camera of the image acquiring unit 23. The display image may be a stored image which is a stored internal image acquired in advance by the image acquisition camera of the image acquiring unit 23.

In this case, the information storage unit 21 of the information generating server 17 stores an internal image acquired by the image acquisition camera of the image acquiring unit 23 in advance. Concerning parties such as owners and users of the target object 2 set in advance a storage setting in the display image generating unit 20 of the information generating server 17 in order to store the internal image acquired by the image acquisition camera of the image acquiring unit 23 in the information storage unit 21.

The storage setting relates to such information as a time zone and time when a stored image is acquired, a storage period, a timing of acquisition, and which camera is used to take image in a case that there are a plurality of cameras. The display image generating unit 20 stores an internal image acquired by the image acquisition camera of the image acquiring unit 23 in the information storage unit 21 in accordance with the storage setting.

Additionally, concerning parties of the target object 2 sets a use condition setting, which is setting of conditions for using a stored image, in the display image generating unit 20. The use condition setting relates to a time zone for using the stored image, for example. The display image generating unit 20, in accordance with the use condition setting, selects a use of a stored image stored in the information storage unit 21 or a use of a real-time image acquired from the image acquiring unit 23. The display image generating unit 20 generates a display image from the selected image and transmits the generated display image to the information generating unit 18.

Consequently, for example, in a case that the target small block 22 is a restaurant, even when image presentation is requested on a regular shop holiday or in midnight when the restaurant is closed, it is possible to provide the internal image by using the stored image. When the stored image is used, the display image generating unit 20 can generate an image such that the image includes such a comment as "It is an image during opening hours".

Next, as an eighth modification example of the first exemplary embodiment, a case is described in which object identifying operation is periodically performed.

In the present exemplary embodiment, the starts of the object identifying operation of the object identifying system is triggered by the user's input of the object identification instruction to the input unit 6. Alternatively, an operation method may be provided in which the identifying unit 7 periodically performs the object identifying operation. In this case, when the user changes the terminal view point 4 and the terminal visual axis 5, the target object 2 designated by the terminal visual axis 5 after the change can be identified without waiting for the object identification instruction from the user.

In this case, the stereo information described in the first modification example of the first exemplary embodiment is used as the positional information of the object group 1 stored in the positional information server 11. The identifying unit 7 of the terminal 3 periodically (e.g. at 1S interval) acquires the positional information of the terminal 3 from the position sensor 9 and the directional information of the terminal 3 from the direction sensor 10. The identifying unit 7 sets the terminal view point 4 and the terminal visual axis 5 based on the acquired positional information and directional information of the terminal 3. When the terminal visual axis 5 deviates from the stereo information of the currently-designated target object 2, the identifying unit 7 starts identifying the target object 2 designated by the terminal visual axis 5 in next.

Figure 12:
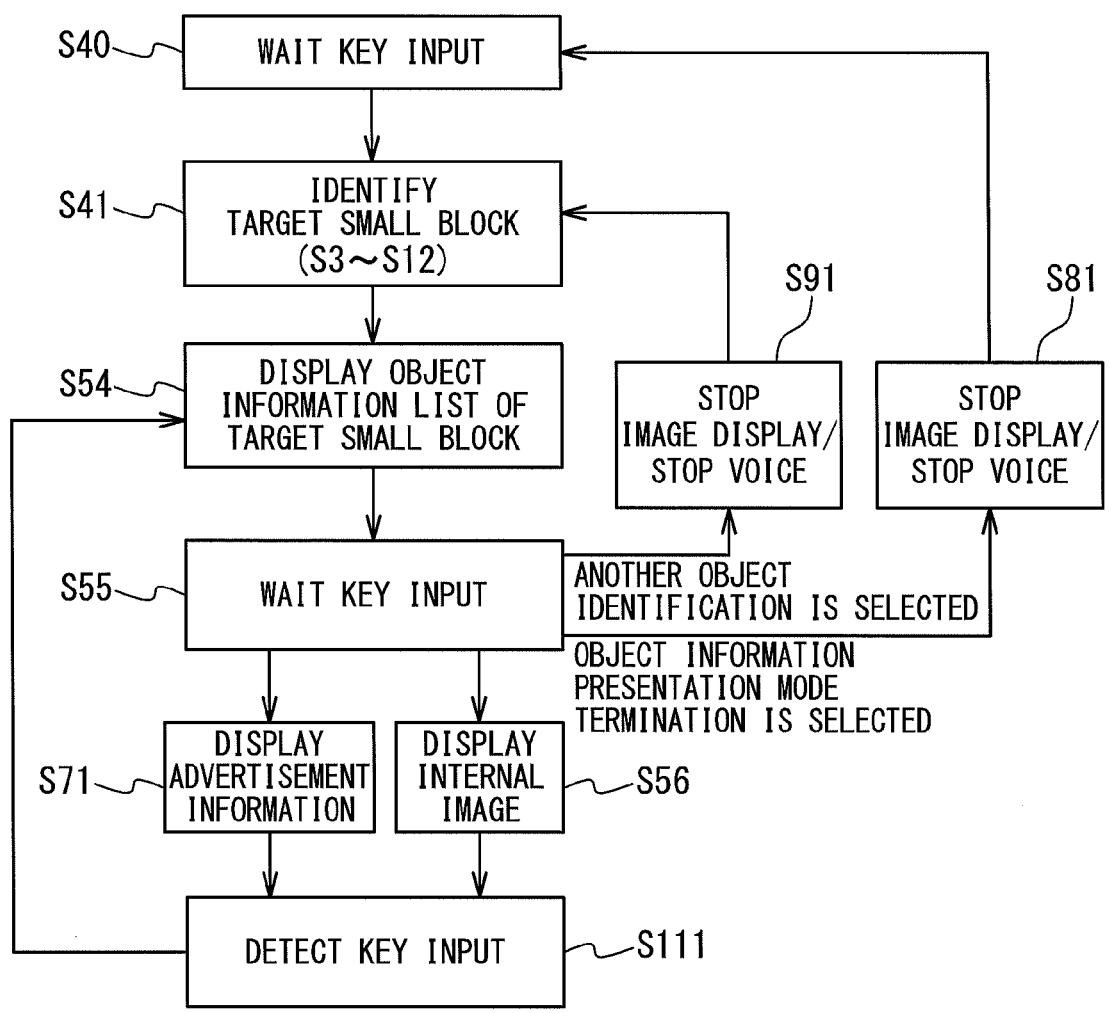
FIG. 12 shows connection relationships among the operational flows of FIG. 9A to FIG. 11 in the first exemplary embodiment.

The operation method is described by using an operational flow shown in FIG. 12. The identifying unit 7 identifies the target object 2, and the information acquiring unit 24 outputs the object information list to the output unit 100 (S54). After that, the terminal 3 is in any of the states of (S55), (S56), and (S71). The identifying unit 7 of the terminal 3 in the state periodically acquires the positional information and the directional information of the terminal 3 and performs the object identifying operation (S3 to S12 in FIG. 2). Therefore, when the user moves the terminal 3 such that a target designated by the terminal visual axis 5 is changed from the currently-designated target object 2 to another target object 2, the terminal 3 can promptly change the information outputted to the output unit 100 to information of the other target object 2. For this reason, the user can obtain information of the target object 2 designated by the terminal visual axis 5 even when changing the direction of the terminal 3 to any direction.

For example, "continuous object identification mode" is prepared in the object information list. In this mode, the internal image of the identified target object 2 is outputted to the output unit 100 without waiting for operation of the user. Even when the user changes the direction of the terminal 3 to various directions, in accordance with the change of the target object 2 pointed by the visual axis 5, the terminal 3 can output the internal image of the changed target object 2 to the output unit 100 in turn. Therefore, the user can more strongly feel a sense of see-through.

When a range surrounded by stereo information of an object through which the terminal visual axis 5 extends does not exist, it is also possible to output a message like "No object exists" to the display unit 15 or the voice producing unit 16. At this time, for example, when a camera is provided in the direction of the terminal visual axis 5 of the terminal 3, outside image taken by the camera may be displayed in place of outputting the message.

Next, as a ninth exemplary embodiment of the first exemplary embodiment, a case is described in which pixelization is performed to a display image.

In the present exemplary embodiment, the display image generating unit 20 may perform pixelization to a face of a person in an image when a display image is generated. In this case, the display image generating unit 20 identifies an outline of a face of a human from a camera image acquired from the image acquiring unit 23 by using face detecting technique. The display image generating unit 20 performs pixelization to the entire of the identified face of human. The display image generating unit 20 outputs the display image, to which pixelization is performed, to the information generating unit 18. Consequently, it is possible to protect privacy of persons in the target object 2.

Next, as a tenth modification example of the first exemplary embodiment, a case is described in which a display image is superimposed on an outside image.

In the present exemplary embodiment, when the terminal 3 is provided with a camera in the direction of the terminal visual axis 5, a display image may be superimposed on an outside image in the direction of the terminal visual axis 5 taken by the camera when the display image is outputted to the output unit 100 of the terminal 3. For example, when a display image is an internal image, an internal image of the target object 2 can be outputted with being superimposed on an outside image of the target object 2. As a result, an effect is provided that the user more strongly feels a sense of see-thorough.

The above is the description of the first exemplary embodiment of the present invention. The user can check an internal image or external image of the target object 2 at the output unit 100 of the terminal 3 and feel a sense of see-thorough.

Next, three cases different from each other in a method of generating a display image are described in respective exemplary embodiments. In the exemplary embodiments described below, the operation method of the object identifying system for identifying the target object 2 is the same as that of the first exemplary embodiment. The operation method of the object information presenting system is the same as that of the first exemplary embodiment with respect to the step of acquiring the object information list by accessing the object information system 17 corresponding to the designated target object 2 and the previous steps. In the following description, the first to tenth modification examples of the first exemplary embodiment are all included.

Hereinafter, when not particularly specified, the object group 1 includes the small block group 222, the candidate object group 111 includes the candidate small block group 232, the object includes the small block, and a case is included in which the target object 2 is the target small block 22.

Second Exemplary Embodiment

[Description of Configuration of the Second Exemplary Embodiment]

First, as the second exemplary embodiment, generation of a display image is described in a case that a plurality of image acquisition cameras are provided. In the present exemplary embodiment, the target object 2 is provided with a plurality of image acquisition cameras of the image acquiring unit 23 therein. The display image generating unit 20 generates a camera selection display image such that the user can select images taken by the respective image acquisition cameras. For example, the display image to be outputted to the display unit 15 of the terminal 3 is generated such that the display region of the display image is divided into the number of the image acquisition cameras and the divided regions respectively display images taken by the image acquisition cameras. The user determines a preferred image taken by the image acquisition camera from the divided regions and select the preferred image thorough the input unit 6 of the terminal 3. The image taken by the image acquisition camera selected by the user is outputted to the output unit 100.

[Description of Operation in the Second Exemplary Embodiment]

Figure 13A:
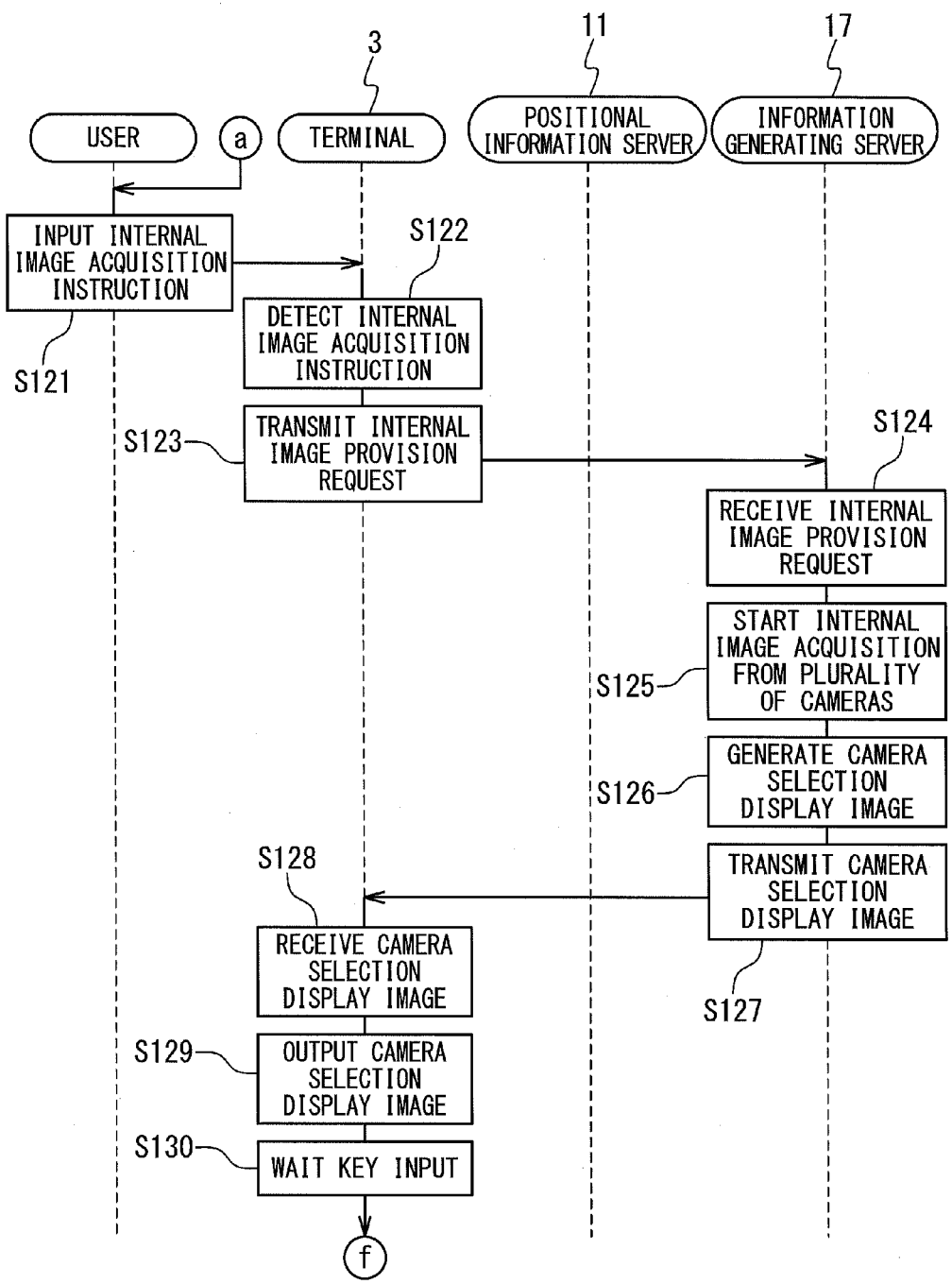
FIG. 13A is an operational flow of an image providing system according to a second exemplary embodiment.
Figure 13B:
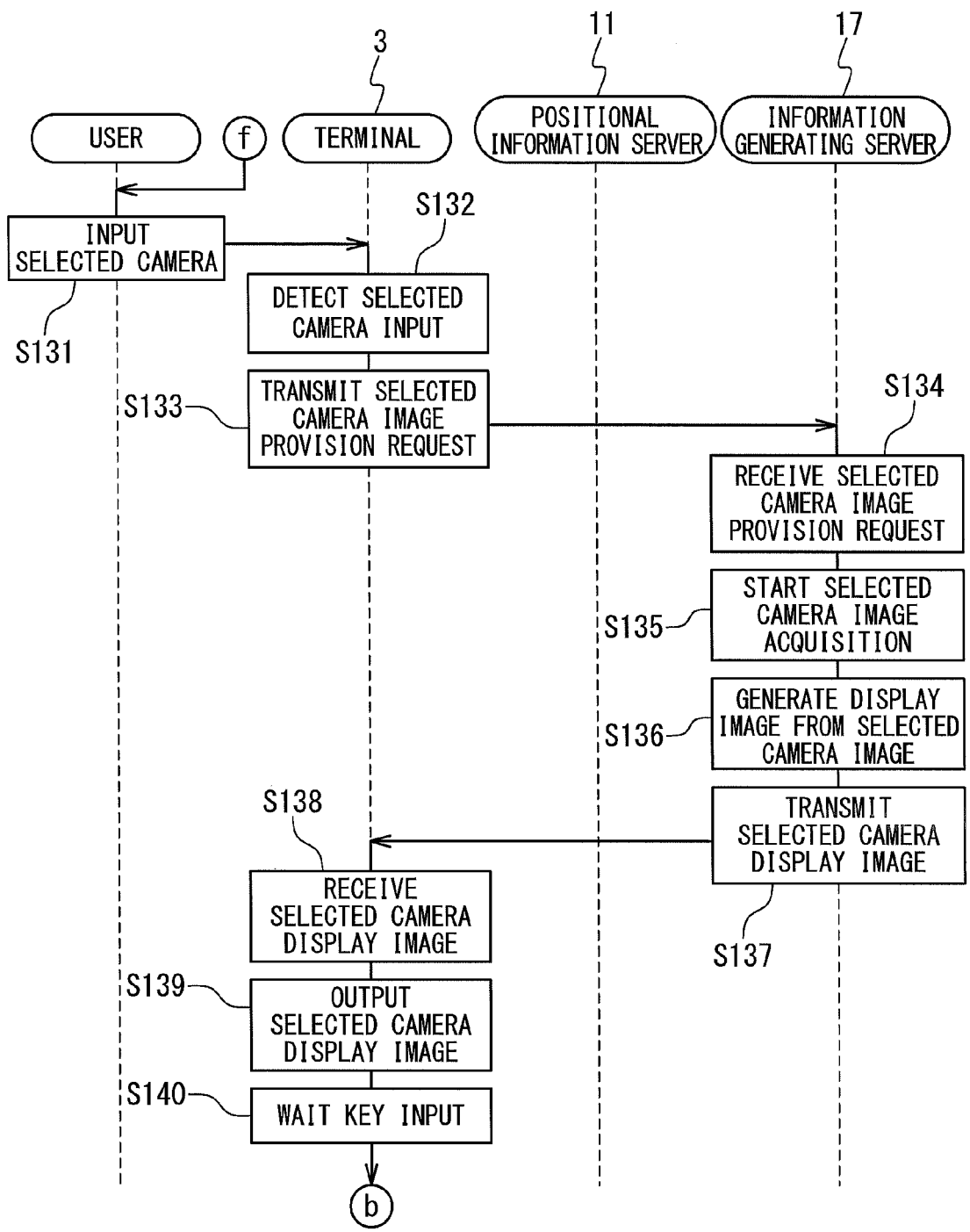
FIG. 13B is an operational flow of the image providing system according to the second exemplary embodiment.

FIG. 13A and FIG. 13B show an operation method according to the second exemplary embodiment. The operation method is the same as that of the first exemplary embodiment with respect to the step of outputting the object information list to the output unit 100 and the previous steps. The terminal 3 has been changed into a state of waiting for key input from the user (S55).

The information acquiring unit 24 outputs the object information list received from the information generating unit 18 of the information generating server 17 to the output unit 100 (S54), and the terminal 3 has been changed into a state of waiting for key input from the user (S55). The user selects an internal image acquisition from the object information list and inputs the internal image acquisition to the input unit 6 (S121). The input unit 6 detects the input of an internal image acquisition instruction by the user and notifies the detection to the information acquiring unit 24 (S122). When being notified of the detection of the internal image acquisition instruction from the input unit 6, the information acquiring unit 24 transmits an internal image presentation request to the information generating unit 18 of the information generating server 17 through the communication unit 8 (S123). The information generating server 17 receives the internal image presentation request through the communication unit 19 (S124). The information generating unit 18 orders the display image generating unit 20 to generate an internal image. When receiving the internal image generation order, the display image generating unit 20 starts acquisition of images from the plurality of image acquisition cameras of the image acquiring unit 23 installed in the target object 2 (S125). The display image generating unit 20 generates a camera selection display image from the images acquired from the plurality of image acquisition cameras of the image acquiring unit 23. The display image generating unit 20 transmits the camera selection display image to the information generating unit 18 (S126). The information generating unit 18 transmits the camera selection display image to the information acquiring unit 24 of the terminal 3 through the communication unit 19 (S127). The information acquiring unit 24 of the terminal 3 receives the camera selection display image through the communication unit 8 (S128). The information acquiring unit 24 outputs the camera selection display image to the display unit 15 of the output unit 100 (S129). The terminal 3 is changed into a state of waiting for input from the user (S130).

The user selects a preferred image taken by the camera from the camera selection display image outputted to the output unit 100. For example, a setting number is assigned in advance to every divided display region of the camera selection display image, and the user inputs as a camera selection instruction, a setting number corresponding to a preferred image region to the input unit 6 (S131). The input unit 6 detects the input of the camera selection instruction and notifies the information acquiring unit 24 of the detection of the camera selection instruction together with the inputted setting number (S132). When being notified of the detection of the camera selection instruction together with the setting number from the input unit 6, the information acquiring unit 24 transmits a selected camera image provision request including the setting number to the information generating unit 18 of the information generating server 17 through the communication unit 8 (S133). The information generating unit 18 of the information generating server 17 receives the selected camera image provision request through the communication unit 19 (S134). The information generating unit 18 determines the selected image acquisition camera based on the setting number included in the selected camera image provision request. The information generating unit 18 orders the display image generating unit 20 to provide a camera image. When receiving the order from the information generating unit 18, the display image generating unit 20 starts acquisition of an internal image from the selected image acquisition camera of the image acquiring unit 23 (S135). The display image generating unit 20 generates a display image from the internal image acquired from the image acquiring unit 23 and outputs the generated display image to the information generating unit 18 (S136). The information generating unit 18 transmits the display image acquired from the display image generating unit 20 to the information acquiring unit 24 of the terminal 3 through the communication unit 19 (S137). The information acquiring unit 24 receives the display image through the communication unit 8 (S138). The information acquiring unit 24 outputs the display image to the output unit 100 (S139). The terminal 3 is changed into a state of waiting for key input (S140).

The above is the description of the second exemplary embodiment. According to the present exemplary embodiment, the user can acquire an internal image of the target object 2 by selecting one camera from the plurality of cameras in accordance with user's preference or by changing cameras.

Third Exemplary Embodiment

[Description of Configuration of the Third Exemplary Embodiment]

Figure 14:
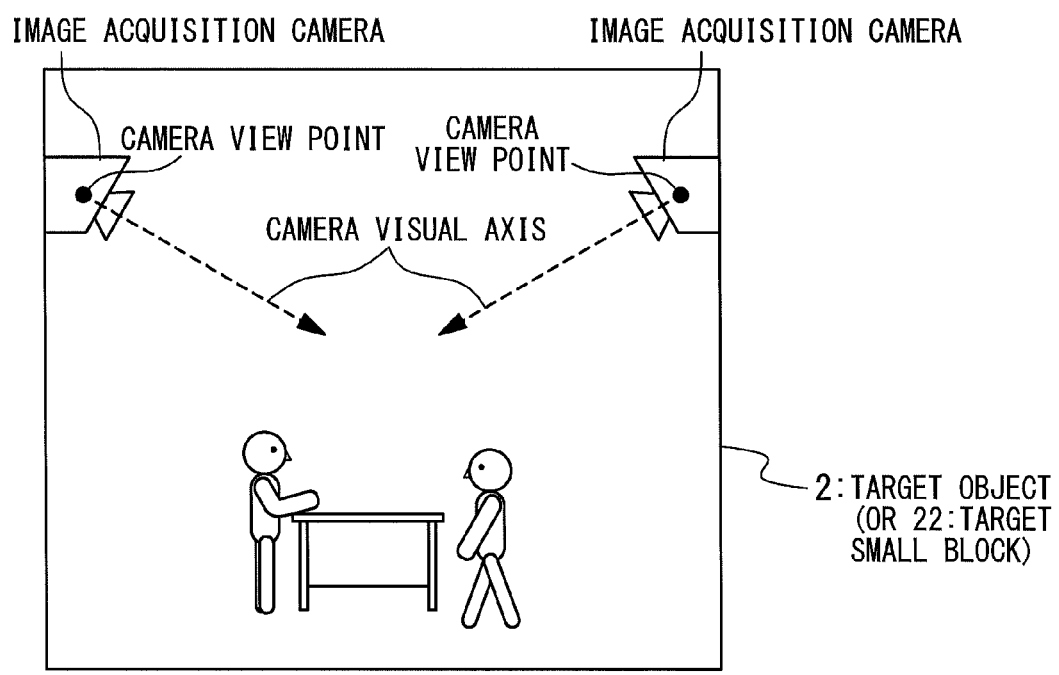
FIG. 14 is a conceptual diagram of image acquisition cameras installed in a target object 2 in a third exemplary embodiment.

Next, as a third exemplary embodiment, a case is described in which a display image is generated by selecting one image acquisition camera closest to the terminal visual axis 5 from a plurality of image acquisition cameras. FIG. 14 shows a plurality of image acquisition cameras installed in the target object 2 in the third exemplary embodiment.

In the present exemplary embodiment, a plurality of image acquisition cameras are installed in the target object 2. The plurality of image acquisition cameras have camera view points indicating positions of the image acquisition cameras and camera visual axes indicating directions of the image acquisition cameras, respectively. The camera visual axis indicates a direction in which an internal image is taken from the camera view point of the image acquisition camera. The image acquisition camera of the image acquiring unit 23 further includes a camera position sensor (not shown) and a camera direction sensor (not shown). The camera position sensor has the same function as the position sensor 9 of a terminal 3 and detects positional information of the image acquisition camera based on the reference coordinates. The camera direction sensor has the same function as the direction sensor 10 of the terminal 3 and detects directional information of the image acquisition camera based on the reference coordinates. The camera view point is set based on the positional information of the image acquisition camera detected by the camera position sensor. The camera visual axis is set based on the directional information of the image acquisition camera detected by the camera direction sensor.

When the image acquisition camera is installed, the camera position sensor and the camera direction sensor detect positional information of the image acquisition camera and directional information of the image acquisition camera. The image acquisition camera transmits the positional information of the image acquisition camera and the directional information of the image acquisition camera to the information storage unit 21 of the information generating server 17. The information storage unit 21 records the positional information of the image acquisition camera and the directional information of the image acquisition camera in the database such that the information are correlated to the image acquisition camera.

In the present exemplary embodiment, there are three methods of selecting one camera from the plurality of image acquisition cameras. Firstly, in a method as a pattern (A), an image acquisition camera is selected for which a terminal-camera visual axis determined by a line connecting the terminal view point 4 and the camera view point is closest to the terminal visual axis 5. Secondly, in a method as a pattern (B), an image acquisition camera is selected which has the camera visual axis closest to the terminal visual axis 5. Thirdly, in a method as a pattern (C), scores are assigned to the image acquisition cameras in accordance with the method of pattern (A) such that lower score is assigned to an image acquisition camera having a terminal-camera visual axis closer to the terminal visual axis 5; scores are assigned to the image acquisition cameras in accordance with the method of pattern (B) such that lower score is assigned to an image acquisition camera closer to the terminal visual axis 5; and based on total score as sum of those scores, an image acquisition camera (in this case, a camera having the lowest total score) closest to the terminal visual axis 5 is selected. The above three selection methods are available.

In the present exemplary embodiment, the image acquisition camera selected in the pattern (A) is referred to as "close view point camera", and a display image generated from an image acquired by the close view point camera is referred to as "close view point camera image". Additionally, the image acquisition camera selected in the pattern (B) is referred to as "close visual axis camera", and a display image generated from an image acquired by the close visual axis camera is referred to as "close visual axis camera image". Further, the image acquisition camera selected in the pattern (C) is referred to as "close view point visual axis camera", and a display image generated from an image acquired by the close view point visual axis camera is referred to as "close view point visual axis camera image". Additionally, the close view point camera, the close visual axis camera, and the close view point visual axis camera are collectively referred to as "close camera", and the close view point camera image, the close visual axis camera image, and the close view point visual axis camera image are collectively referred to as "close camera image".

In the present exemplary embodiment, the display image generating unit 20 of the information generating server 17 further includes the calculation method for identifying the target object 2, which is mentioned in the first exemplary embodiment, as in the case of the identifying unit 7 of the terminal 3.

In the pattern (A), the display image generating unit 20 calculates and identifies the close view point camera by using the above calculation method, based on positional information of the terminal 3, directional information of the terminal 3, and positional information of the image acquisition camera. The display image generating unit 20 selects the identified close view point camera and acquires an internal image from the close view point camera. The display image generating unit 20 generates a close view point camera image as a display image from the internal image acquired from the close view point camera.

In the pattern (B), the display image generating unit 20 calculates and identifies a close visual axis camera by using the above-mentioned calculation method, based on directional information of the terminal 3 and directional information of the image acquisition camera. The display image generating unit 20 selects the identified close visual axis camera and acquires an internal image from the close visual axis camera. The display image generating unit 20 generates a close visual axis camera image as a display image from the internal image acquired from the close visual axis camera image.

In the pattern (C), firstly, based on positional information of the terminal 3, directional information of the terminal 3 and positional information of the image acquisition cameras, the display image generating unit 20 assigns a score L to every image acquisition camera in the order of closeness between the terminal-camera visual axis and the terminal visual axis 5 in accordance with the method of the pattern (A) (e.g. in ascending order from closest, 1, 2, . . . l). Next, in accordance with the method of the pattern (B), the display image generating unit 20 assigns a score K to every image acquisition camera in the order of closeness between the camera visual axis of the image acquisition camera and the terminal visual axis 5 of the terminal 3 based on directional information of the terminal 3 and directional information of the image acquisition cameras (e.g. in ascending order from the closest, 1, 2, . . . k).

The display image generating unit 20 adds the score L to the score K to calculate a score α, and identifies a camera with the smallest score α as the close view point visual axis camera. When a plurality of the smallest α exist, a camera with the smallest score L among the image acquisition cameras with the smallest α may be identified as the close view point visual axis camera, for example. Alternatively, not the image acquisition camera with the smallest score L but an image acquisition camera with the smallest score K may be identified as the close view point visual axis camera. The display image generating unit 20 selects the identified close view point visual axis camera and acquires an internal image from the close view point visual axis camera. The display image generating unit 20 generates a close view point visual axis camera image as a display image from the internal image acquired from the close view point visual axis camera image.

In the pattern (A), an image acquisition camera can be selected which is close to a direction pointed by the terminal visual axis 5. In the pattern (B), an image acquisition camera can be selected which takes images in a direction close to a direction pointed by the terminal visual axis 5. In the pattern (C), an image acquisition camera can be selected which is close to a direction pointed by the terminal visual axis 5 and which takes images in a direction close to the terminal visual axis 5. A selection from these patterns may be carried out in accordance with demand of the user, or these patterns may be combined in stepwise manner. A flexible choice depending on the situation would provide an effect that the user more strongly feels a sense of see-thorough. Note that the above-mentioned identification of the close camera is performed after the identification of the target object 2. While keeping the identified target object 2 being selected fixedly, the close visual axis camera is identified from the plurality of image acquisition cameras installed in the target object 2.

By moving the terminal 3, the terminal view point 4, the terminal visual axis 5, or the both changes. The information acquiring unit 24 of the terminal 3 periodically acquires positional information of the terminal 3 from the position sensor 9 and periodically acquires directional information of the terminal 3 from the direction sensor 10. The information acquiring unit 24 of the terminal 3 newly transmits the newly-acquired positional information and directional information of the terminal 3 to the display image generating unit 20 of the information generating server 17. The display image generating unit 20 newly identifies the close camera by using the above-mentioned methods (the pattern A, the pattern B, or the pattern C) based on the newly-received positional information and directional information of the terminal 3. The display image generating unit 20 judges whether or not the newly-identified close camera is identical to the currently-selected close camera. When the close cameras are not identical as a result of the judgment, the display image generating unit 20 newly selects the newly-identified close camera.

The display image generating unit 20 newly generates a close camera image as a display image from an internal image acquired by the newly-selected close camera. The display image generating unit 20 outputs the newly-generated close camera image to the information generating unit 18. The information generating unit 18 transmits the new close camera image to the information acquiring unit 24 of the terminal 3 through the communication unit 19. The information acquiring unit 24 of the terminal 3 receives the new close camera image transmitted by the information generating unit 18 through the communication unit 8. The information acquiring unit 24 outputs the new close camera image to the output unit 100 of the terminal 3.

Additionally, the camera position sensor and the camera direction sensor of the image acquisition camera of the image acquiring unit 23 may periodically detect a position of the camera and a direction of the camera. The image acquiring unit 23 transmits detected position and direction of the camera to the information storage unit 21 of the information generating server 17. The information storage unit 21 updates the position of the camera and the direction of the camera stored in the database. Consequently, even when the installed image acquisition camera is moved, camera positional information and camera directional information after the movement can be obtained.

[Description of Operation in the Third Exemplary Embodiment]

Figure 15B:
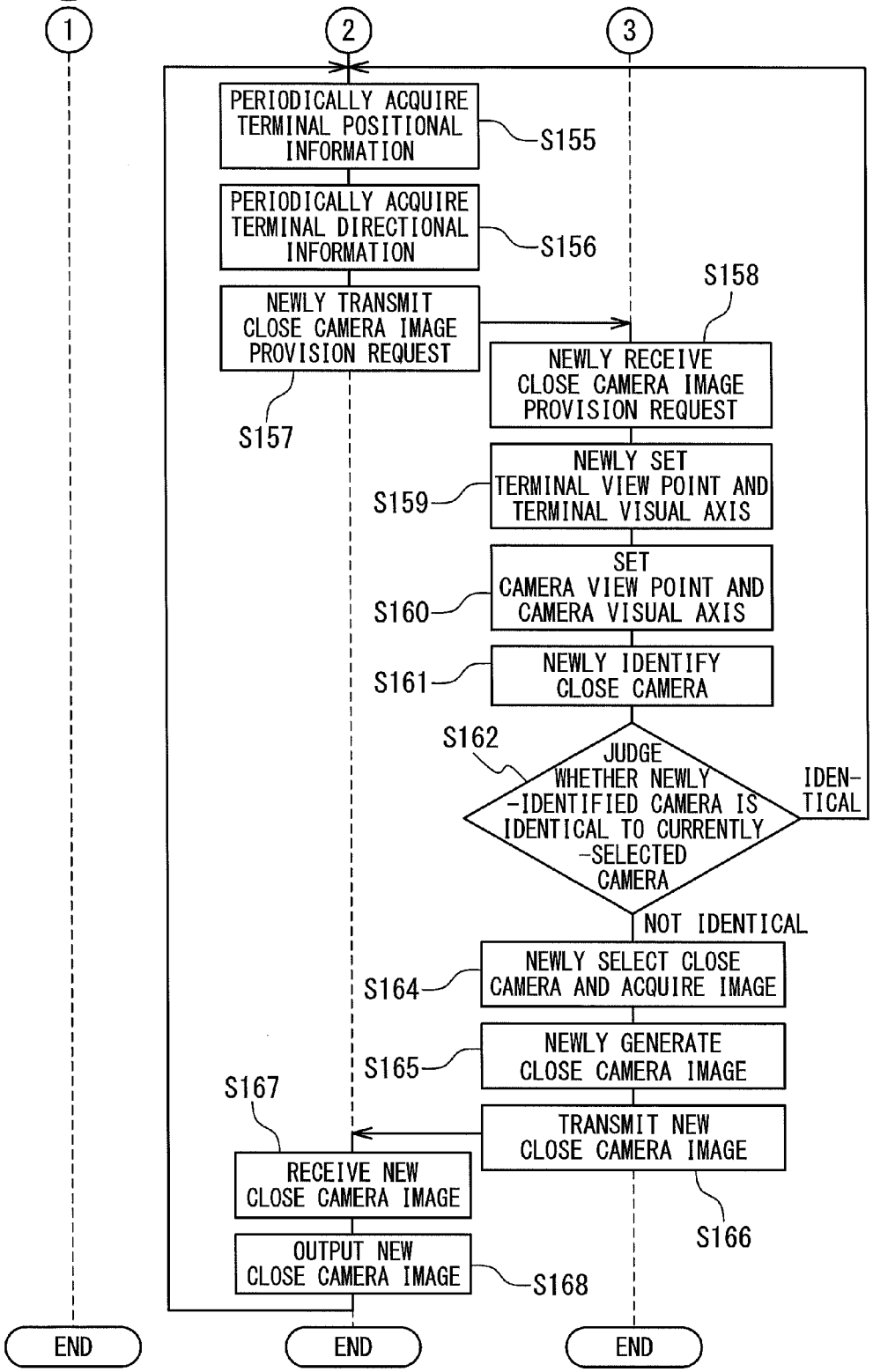
FIG. 15B is an operational flow of the image providing system according to the third exemplary embodiment.

Next, an operation method according to the third exemplary embodiment is described. FIG. 15A and FIG. 15B show the operation method according to the third exemplary embodiment. In the description, a case is described in which a "close view point visual axis camera" is selected and a "close view point visual axis camera image" is generated as a display image. As for operation methods in cases that a "close view point camera" or a "close visual axis camera" is selected, in a later-described description of operation method "identify close view point visual axis camera (S149)", a identifying method of an image acquisition camera is replaced as above-described (the pattern (A) or the pattern (B)). The step of outputting the object information list to the output unit 100 and the previous steps are same as those of the first exemplary embodiment. The terminal 3 has been changed into a state of waiting for key input from the user (S55).

The user selects close view point visual axis camera image acquisition from the object information list, and inputs the close view point visual axis camera image acquisition to the input unit 6 (S141). The input unit 6 detects the input of close view point visual axis camera image acquisition instruction (S142). The input unit 6 notifies the information acquiring unit 24 of the detection of the close view point visual axis camera image acquisition instruction. When receiving the notification from the input unit 6, the information acquiring unit 24 acquires positional information of the terminal 3 from the position sensor 9 of the terminal 3 (S143), and acquires directional information of the terminal 3 from the direction sensor 10 of the terminal 3 (S144). The information acquiring unit 24 transmits a close view point visual axis camera image provision request including the positional information of the terminal 3 and the directional information of the terminal 3 to the information generating unit 18 of the information generating server 17 through the communication unit 8 (S145). The information generating unit 18 receives the close view point visual axis camera image provision request through the communication unit 19 (S146). The information generating unit 18 notifies the display image generating unit 20 of a close view point visual axis camera image generation order together with the positional information of the terminal 3 and the directional information of the terminal 3. The display image generating unit 20 obtains the terminal view point 4 and the terminal visual axis 5 based on the acquired positional information and directional information of the terminal 3

(S147). The display image generating unit 20 obtains a camera view point and a camera visual axis for every image acquisition camera based on the positional information of the camera and the directional information of the camera stored in the database of the information storage unit 21 (S148). The display image generating unit 20 identifies a close view point visual axis camera based on the terminal view point 4, the terminal visual axis 5, and the camera view points and the camera visual axes of the respective image acquisition cameras (S149). The display image generating unit 20 selects the identified close view point visual axis camera and acquires an internal image (S150). The display image unit 20 generates a close view point visual axis camera image as a display image from the internal image acquired by the close view point visual axis camera (S151). The display image generating unit 20 outputs the close view point visual axis camera image to the information generating unit 18. The information generating unit 18 transmits the close view point visual axis camera image to the information acquiring unit 24 of the terminal 3 through the communication unit 19 (S152). The information acquiring unit 24 of the terminal 3 receives the close view point visual axis camera image through the communication unit 8 (S153). The information acquiring unit 24 outputs the close view point visual axis camera image to the output unit 100 (S154).

By moving the terminal 3, the terminal view point 4, the terminal visual axis 5, or the both changes. The information acquiring unit 24 of the terminal 3, periodically (e.g. every one second), newly acquires positional information of the terminal 3 from the position sensor 9 (S155), and newly acquires directional information of the terminal 3 from the direction sensor 10 (S156). The information acquiring unit 24 newly transmits a close view point visual axis camera image provision request including the newly-acquired positional information of the terminal 3 and the newly-acquired directional information of the terminal 3 to the information generating unit 18 of the information generating server 17 through the communication unit 8 (S157). The information generating unit 18 newly receives the close view point visual axis camera image provision request from the information acquiring unit 24 through the communication unit 19 (S158). The information generating unit 18 notifies the display image generating unit 20 of the new positional information and the new directional information of the terminal 3, which are newly received. The display image generating unit 20 newly sets the terminal view point 4 and the terminal visual axis 5 based on the position and direction of the terminal 3, which are newly received (S159). The display image generating unit 20 sets camera view points and camera visual axes based on positions and camera directional information of the respective image acquisition cameras stored in the information storage unit 21 (S160). The display image generating unit 20 newly identifies a close view point visual axis camera by using the above-mentioned calculation method based on the terminal view point 4, the terminal visual axis 5, and the respective camera view points and the respective camera visible axes, which are newly set (S161). The display image generating unit 20 judges whether or not the newly-identified close view point visual axis camera is identical to the close view point visual axis camera that is currently selected by the display image generating unit 20 (S162). When the judgment result shows identical, the display image generating unit 20 does not change the currently-selected close view point visual axis camera. In this case, return to the operation in which the terminal 3 periodically detects positional information of the terminal 3 and directional information of the terminal 3 (S155) while keeping selecting the currently-selected close view point visual axis camera. When the judgment result shows not-identical, the display image generating unit 20 newly selects the newly-identified close view point visual axis camera (S164). The display image generating unit 20 generates a new close view point visual axis camera image from an internal image acquired by the newly-selected close view point visual axis camera (S165). The display image generating unit 20 outputs the generated new close view point visual axis camera image to the information generating unit 18. The information generating unit 18 transmits the new close view point visual axis camera image generated by the display image generating unit 20 to the information acquiring unit 24 of the terminal 3 through the communication unit 19 (S166). The information acquiring unit 24 of the terminal 3 receives the new close view point visual axis camera image through the communication unit 8 (S167). The information acquiring unit 24 outputs the new close view point visual axis camera image to the output unit 100 (S168). After that, the information acquiring unit 24 repeats the operation in which periodically, a position of the terminal 3 is acquired (S155), a direction of the terminal 3 is acquired (S156), and a close view point visual axis camera is identified based on the information. The above is the description of the operation method according to the third exemplary embodiment.

[Description of Modification Examples of the Third Exemplary Embodiment]

Next, as a first modification example of the third exemplary embodiment, a case is described in which calculation according to the present exemplary embodiment is performed by the identifying unit 7. In the present exemplary embodiment, the display image generating unit 20 of the information generating server 17 calculates a close camera. This may be an operation method in which the identifying unit 7 of the terminal 3 performs the calculation. In this case, the identifying unit 7 of the terminal 3 acquires camera positional information and camera directional information of every image acquisition camera from the information storage unit 21 of the information generating server 17 to perform the calculation.

Additionally, the information generating server 17 further includes an identifying unit (not shown) of the information generating server 17 having the same function as the identifying unit 7 of the terminal 3. In this case, the identifying unit 7 of the information generating server 17 performs the calculation based on positional information of the terminal 3 and directional information of the terminal 3 received from the identifying unit 7.

Next, as a second modification example of the third exemplary embodiment, a modification example of the method of selecting an image acquisition camera is described. In the present exemplary embodiment, the information acquiring unit 24 performs recalculation for newly identifying a close camera based on positional information and directional information of the terminal 3, which are periodically acquired. This may be an operation in which the information acquiring unit 24 starts the recalculation based on key input in the input unit 6 by the user. In this case, such an item as "reselect camera" is displayed in a display image outputted to the display unit 15 of the terminal 3 for example. The user selects the item of "reselect camera" through the input unit 6. The input unit 6 detects a camera reselection instruction and notifies the detection to the information acquiring unit 24. Operation thereafter is as mentioned above.

The above is the description of the third exemplary embodiment. According to the present exemplary embodiment, the user can select an image acquisition camera in accordance with the demand of the user by changing the position or the direction of the terminal 3, and can acquire an internal image of an object. Since the user can check the internal image in accordance with the intention of the user, the user would more strongly feel a sense of seeing-thorough the inside of the object.

Fourth Exemplary Embodiment

[Description of Configuration of the Fourth Exemplary Embodiment]

Next, as a fourth exemplary embodiment, a case is described in which an arbitrary view point image is generated as a display image. The arbitrary view point image is an image in which the inside of the target object 2 is seen from an arbitrary terminal view point 4 along an arbitrary terminal visual axis 5. In the present exemplary embodiment, a plurality of image acquisition cameras are installed. Additionally, the display image generating unit 20 of the information generating server 17 further has a calculation method, which is the same as that of the identifying unit 7 of the terminal 3 mentioned above.

In the present exemplary embodiment, the plurality of image acquisition cameras are installed at a certain pitch such that the cameras can take images of a whole surface on an inside of the target object 2. For images of the respective image acquisition cameras, the display image generating unit 20, in accordance with the technique disclosed in Japanese Patent Publication (JP-P2004-220312A), finds corresponding points between pixels by other cameras with respect to every pixel of a single frame of the same timing, and further estimates a three-dimensional shape. The arrangement of the image acquisition cameras is not limited to this.

The display image generating unit 20 of the information generating server 17 sets initial values of the terminal view point 4 and the terminal visual axis 5 based on the positional information and the directional information of the terminal 3 received from the terminal 3. The three-dimensional shape generated from the plurality of camera images is perspective-projected to a two-dimensional plane which contains the initial value terminal view point 4 and is perpendicular to the initial value terminal visual axis. The display image generating unit 20 generates as a display image, an image in which the three-dimensional shape is seen from the terminal view point 4 along the terminal visual axis 5. In the present exemplary embodiment, the display image thus generated is referred to as arbitrary view point image. The user can check as an internal image of the target object 2, the arbitrary view point image in which the three-dimensional shape is seen from the terminal view point 4 along the terminal visual axis 5, at the display unit 15 of the terminal 3. Estimation of a three-dimensional shape and generation of an arbitrary view point image are periodically performed at every single frame or every several frames of the image acquisition cameras.

In the present exemplary embodiment, a three-dimensional shape is estimated by using the plurality of image acquisition cameras to generate an arbitrary view point image. However, when a 3D camera capable of estimating a three-dimensional shape is used, an arbitrary view point image can be generated by using only a single image acquisition camera. By using the 3D camera as the image acquisition camera, the three-dimensional shape can be estimated. By seeing the three-dimensional shape from the terminal view point 4 along the terminal visual axis 5, it is also possible to generate the arbitrary view point image. Although a case, in which a plurality of image acquisition cameras are used, is described in the following description, estimation of a three-dimensional shape includes a case of generation based on an image taken by a single 3D camera.

By moving the terminal 3, the terminal view point 4, the terminal visual axis 5, or the both changes. The information acquiring unit 24 of the terminal 3, periodically, acquires positional information from the position sensor 9 and directional information from the direction sensor 10, and transmits the acquired positional information and directional information to the information generating unit 18 of the information generating server 17. The display image generating unit 20 of the information generating server 17 newly sets the terminal view point 4 and the terminal visual axis 5 based on the positional information and directional information of the terminal 3 which are newly received from the terminal 3.

When the terminal view point 4 and the terminal visual axis 5 which are newly set, change from the initial values, in response to this, the display image generating unit 20 newly generates an arbitrary view point image in which a three-dimensional shape is seen from the new terminal view point 4 along the new terminal visual axis 5. Consequently, the user can see an arbitrary view point image in which a three-dimensional shape is seen from an arbitrary terminal view point 4 along an arbitrary terminal visual axis 5.

[Description of Operation in the Fourth Exemplary Embodiment]

Figure 16B:
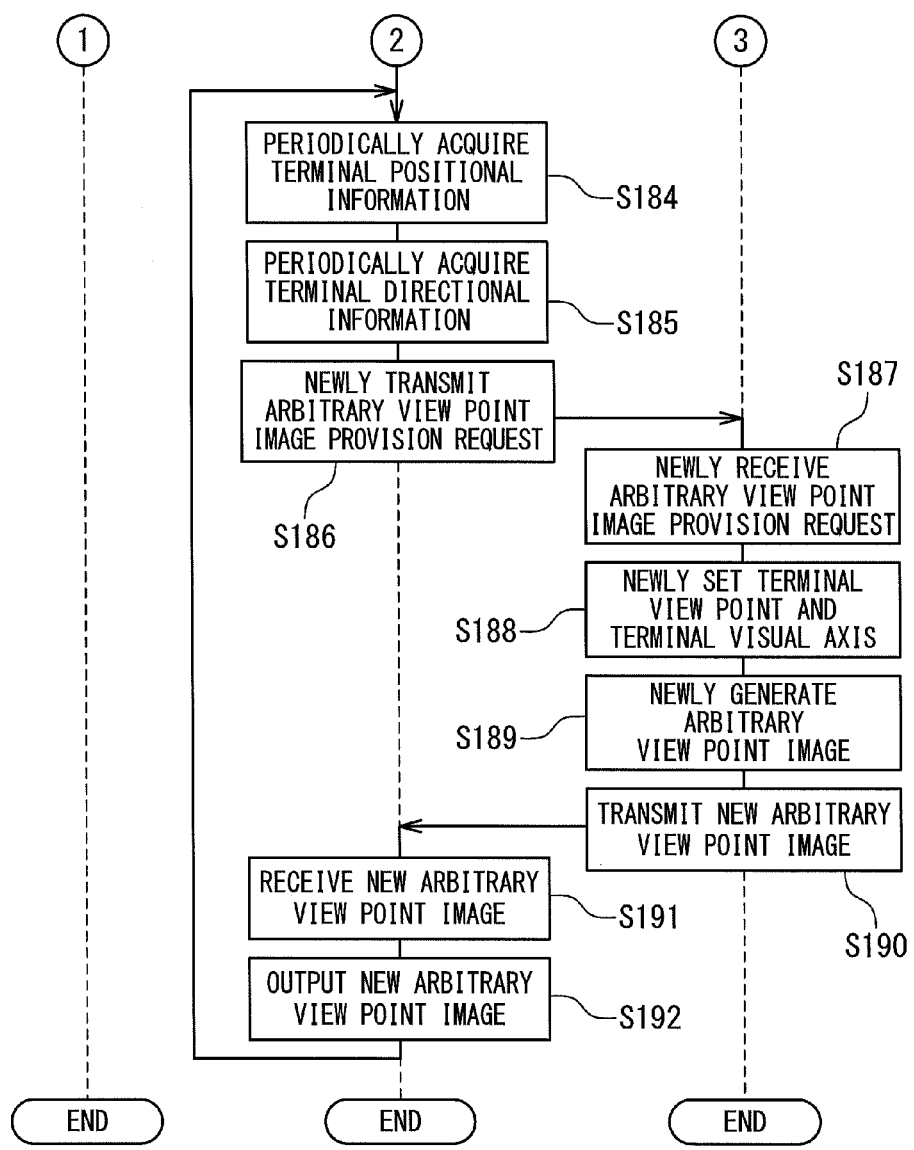
FIG. 16B is an operational flow of the image providing system according to the fourth exemplary embodiment.

FIG. 16A and FIG. 16B show an operation method according to the fourth exemplary embodiment. The operation method according to the fourth exemplary embodiment is described by using FIG. 16A and FIG. 16B. The step of outputting the object information list to the output unit 100 and the previous steps are same as those of the first exemplary embodiment. The terminal 3 has been changed into a state of waiting for key input from the user (S55).

The user inputs an arbitrary view point image acquisition instruction of the object information list to the input unit 6 (S171). The input unit 6 of the terminal 3 detects the input of the arbitrary view point image acquisition instruction from the user and notifies the detection to the information acquiring unit 24 (S172). When receiving the notification from the input unit 6, the information acquiring unit 24 of the terminal 3 acquires a position of the terminal 3 from the position sensor 9 (S173), and acquires a direction of the terminal 3 from the direction sensor 10 (S174). The information acquiring unit 24 transmits an arbitrary view point image provision request including the positional information of the terminal 3 and the directional information of the terminal 3 to the information generating unit 18 of the information generating server 17 through the communication unit 8 (S175). The information generating unit 18 of the information generating server 17 receives the arbitrary view point image provision request through the communication unit 19 (S176). The information generating unit 18 outputs an arbitrary view point image generation order together with the positional information of the terminal 3 and the directional information of the terminal 3 included in the arbitrary view point image provision request to the display image generating unit 20. When receiving the order from the information generating unit 18, the display image generating unit 20 sets the terminal view point 4 and the terminal visual axis 5 based on the received positional information and directional information of the terminal 3. The display image generating unit 20 stores the set terminal view point 4 and terminal visual axis 5 as initial values (S177). The display image generating unit 20 starts acquisition of images from the plurality of image acquisition cameras of image acquiring unit 23 (S178). The display image generating unit 20, based on the images from the plurality of image acquisition cameras, in accordance with Japanese Patent Publication (JP-P2004-220312A), finds corresponding points between pixels by other cameras with respect to every pixel of a single frame of the same timing, and estimates a three-dimensional shape (S179). The display image generating unit 20 generates an arbitrary view point image in which the three-dimensional shape of the image acquiring unit 23 is seen from the initial value terminal view point 4 along the initial value terminal visual axis 5 (S180). The display image generating unit 20 outputs the arbitrary view point image to the information generating unit 18. The information generating unit 18 transmits the arbitrary view point image to the information acquiring unit 24 of the terminal 3 through the communication unit 19 (S181). The information acquiring unit 24 receives the arbitrary view point image through the communication unit 8 (S182). The information acquiring unit 24 outputs the arbitrary view point image to the output unit 100 (S183).

By moving the terminal 3, the terminal view point 4, the terminal visual axis 5, or the both changes. The information acquiring unit 24, periodically (e.g. every one second), newly acquires a position of the terminal 3 from the position sensor 9 (S184) and newly acquires a direction of the terminal 3 from the direction sensor 10 (S185). The information acquiring unit 24 newly transmits an arbitrary view point image provision request including the newly-acquired positional information of the terminal 3 and the newly-acquired directional information to the information generating unit 18 of the information generating server 17 through the communication unit 8 (S186). The information generating unit 18 of the information generating server 17 newly receives the arbitrary view point image provision request through the communication unit 19 (S187). The display image generating unit 20 newly sets the terminal view point 4 and the terminal visual axis 5 based on the new positional information of the terminal 3 and the new directional information of the terminal 3 which are newly received by the information generating unit 18 (S188). The display image generating unit 20 newly generates based on the new terminal view point 4 and the new terminal visual axis 5, an arbitrary view point image in which the three-dimensional shape is seen from the new terminal view point 4 along the new terminal visual axis 5 (S189). The display image generating unit 20 outputs the newly-generated arbitrary view point image to the information generating unit 18. The information generating unit 18 transmits the new arbitrary view point image to the information acquiring unit 24 of the terminal 3 through the communication unit 19 (S190). The information acquiring unit 24 of the terminal 3 receives the new arbitrary view point image through the communication unit 8 (S191). The information acquiring unit 24 outputs the new arbitrary view point image to the output unit 100 (S192). When the internal image is taken by the single 3D camera, the above-mentioned (S178) and (S179) are changed to "estimate the three-dimensional shape based on the image by the image acquisition camera". The above is the description of the operation method according to the fourth exemplary embodiment.

[Description of Modification Examples of the Fourth Exemplary Embodiment]

Next, as a first modification example of the fourth exemplary embodiment, a modification example is described for the section to calculate the terminal view point 4 and the terminal visual axis 5. In the present exemplary embodiment, the display image generating unit 20 of the information generating server 17 calculates the terminal view point 4 or the terminal visual axis 5. This may be an operation method in which the identifying unit 7 of the terminal 3 performs the calculation. An operation method is considered in which the display image generating unit 20 of the information generating server 17 generates an arbitrary view point image based on the terminal view point 4 and the terminal visual axis 5 acquired from the information acquiring unit 24 of the terminal 3.

It is also possible to additionally provide the information generating server 17 with an identifying unit (not shown) of the information generating server 17 having the same function as the identifying unit 7 of the terminal 3. In this case, an operation method is considered in which the identifying unit of the information generating server 17, based on the position of the terminal 3 and the direction of the terminal 3 received from the terminal 3, calculates the terminal view point 4 and the terminal visual axis 5 and notifies the calculation results to the display image generating unit 20.

Next, as a second modification example of the fourth exemplary embodiment, a modification example of a method of acquiring positional information and directional information of the terminal 3 is described. In the present exemplary embodiment, the information acquiring unit 24 performs recalculation based on the periodically-acquired positional information and directional information. The recalculation may be started in response to key input by the user through the input unit 6. In this case, such an item as "change position and direction" is displayed in a display image outputted to the output unit 100 for example. When the user selects the item of "change position and direction" through the input unit 6, the information acquiring unit 24 re-acquires positional information and directional information, and an arbitrary view point image is outputted to the output unit 100 in accordance with the above-mentioned operation method. In the arbitrary view point image, the three-dimensional shape is seen from the new terminal view point 4 along the new terminal visual axis 5.

The above is the description of the fourth exemplary embodiment. According to the present exemplary embodiment, by changing the position and the direction of the terminal 3, the user can check an internal image of the object as an arbitrary view point image in which a three-dimensional shape is seen from an arbitrary terminal view point along an arbitrary terminal visual axis 5. Since the user can check the internal image of the object in accordance with the demand of the user, the user would more strongly feel a sense of seeing-thorough the inside of the object.

In all the exemplary embodiments of the present invention, it is preferable that the display unit 15 of the terminal 3 is arranged on a surface opposite to a direction pointed by the terminal visual axis 5, i.e., a surface that faces the user. As a result, the user can see an image of an object through the terminal 3. Furthermore, when the terminal view point 4 is arranged at the center point of the display unit 15, the user can see an image of an object seen from the display unit 15. Since the user can see with his/her eyes, a landscape including a surface of an actual object around the terminal 3, an effect is provided that the user can feel more strongly a sense of see-through. In this case, an error in positional information is caused due to the difference between positions of the position sensor 9 and the terminal view point 4 of the terminal 3. An accurate position of the terminal view point 4 can be identified by correcting the error in positional information in advance.

Finally, all the exemplary embodiments of the present invention from the first exemplary embodiment to the fourth exemplary embodiment can not only be implemented individually but also be implemented in combination. When a plurality of image acquisition cameras are installed inside the target object 2 for example, the user may select one of display image generation methods which are different according to the exemplary embodiments, through the input unit 6 of the terminal 3.

For example, the user can select a camera and acquire an image of a floor of a specific building, as a small block, according to the second exemplary embodiment; change the image into an arbitrary view point image according to the fourth exemplary embodiment to freely look around inside the object in accordance with a visual axis changed by the user; then move the visual axis to a gazebo at a higher portion; and look around the opposite side of the building, which is can not be seen from the position of the user, while changing the visual axis according to the third exemplary embodiment.

As a result, the user can fully feel a sense of freely seeing-through an inside of an object or the opposite side of the object.

According to the above image providing system, the target object 2 can be identified which is arbitrarily designated by the user by using the terminal visual axis 5 set into a specific direction of the terminal 3 or by using the user visual axis 55 determined from a position of the user and a position of the terminal 3; an image of the identified target object 2 can be generated and provided in accordance with the terminal visual axis 5 or the user visual axis 55 which are changed in accordance with the demand of the user; and the user can acquire information while feeling a sense of freely seeing-through the object.

Although the present invention has been described above in conjunction with several exemplary embodiments thereof, the present invention is not limited to the above exemplary embodiments. Various modifications which are understandable by those skilled in the art within the scope of the present invention can be applied to the configurations and details of the present invention.

What is claimed is:

1. An image providing system comprising:
    a terminal which has a visual axis by using which a user points a target object to be identified from a plurality of objects and is configured to identify said target object pointed by said visual axis from said plurality of objects;
    an information generating server configured to acquire an internal image as an image of an inside of said target object or an external image as an image of external surroundings, which is taken from said target object, and generate a display image as an image to be outputted by said terminal based on said internal image or said external image, wherein said external surroundings can not be seen from said user with eyes and said display image is an image to be seen along a direction of the terminal which is a direction of said visual axis or a direction close to said direction of said visual axis; and
    a positional information server configured to store object positional information as three-dimensional positional information of each of said plurality of objects and retrieval information as information for accessing to information generating server corresponding to said target object such that said object positional information and said retrieval information are respectively correlated to said each object,
    wherein said terminal includes:
    a position sensor configured to detect terminal positional information indicating a position of said terminal,
    a direction sensor configured to detect terminal directional information indicating said direction of said terminal,
    a user image acquisition camera for acquiring an image of a user,
    an identifying unit configured to detect a face and both eyes from an image of a face of a user taken by said user image acquisition camera, set a user position indicating a position of said user at a center point between said both eyes based on said image of said face and said terminal positional information, and identify said target object based on said user position, said terminal positional information and said object positional information,
    an information acquiring unit configured to access said information generating server corresponding to said target object based on said retrieval information, and acquire said display image of said target object, and
    an output unit configured to display said display image.

2. The image providing system according to claim 1, wherein said information generating server includes:
    an image acquiring unit including one or more image acquisition cameras for acquiring said internal image or said external image;
    a display image generating unit configured to generate said display image based on said internal image or said external image; and
    an information generating unit configured to order said output unit to generate information based on a request from said information acquiring unit.

3. The image providing system according to claim 2, wherein said one or more image acquisition cameras of said image acquiring unit further includes:
    a camera position sensor configured to detect camera positional information indicating a position of a camera; and
    a camera direction sensor configured to detect camera directional information indication a direction of a camera,
    said display image generating unit acquires said terminal positional information, said terminal directional information, or both of said terminal positional information and said terminal directional information,
    said display image generating unit, based on said camera positional information, said camera directional information, or both of said camera positional information and said camera directional information and based on said terminal positional information, said terminal directional information, or both of said terminal positional information and said terminal directional information, identifies from said one or more image acquisition cameras, a close camera as said image acquisition camera closest to said visual axis of said terminal, and
    said display image generating unit generates said display image based on said internal image or said external image acquired by said close camera.

4. The image providing system according to claim 2, wherein said information generating server further includes an information storage unit that stores relevant information as information related to said target object,
    said information storage unit stores as said relevant information, said internal image or said external image acquired by said image acquiring unit, and
    said display image generating unit generates said display image based on said internal image or said external image stored in said information storage unit.

5. An image providing system comprising:
    a terminal which has a visual axis by using which a user points a target object to be identified from a plurality of objects and is configured to identify said target object pointed by said visual axis from said plurality of objects;
    an information generating server configured to acquire an internal image as an image of an inside of said target object, and generate a display image as an image to be outputted by said terminal based on said internal image, wherein said internal image can not be seen from said user with eyes and said display image is an image to be seen along a direction of the terminal which is a direction of said visual axis or a direction close to said direction of said visual axis; and a positional information server configured to store object positional information as three-dimensional positional information of each of said plurality of objects and retrieval information as information for accessing to information generating server corresponding to said target object such that said object positional information and said retrieval information are respectively correlated to said each object, wherein said terminal identifies said target object pointed by said visual axis based on a position of said terminal and the direction of said terminal, accesses said information generating server corresponding to said target object based on said retrieval information of said identified target object, acquires said display image of said target object from said information generating server, and displays said display image, said terminal including:

a position sensor configured to detect terminal positional information indicating the position of said terminal;

a direction sensor configured to detect terminal directional information indicating said direction of said terminal;

an identifying unit configured to identify said target object based on said terminal positional information, said terminal directional information and said object positional information;

an output unit configured to display said display image; and an information acquiring unit configured to access said information generating server corresponding to said target object based on said retrieval information, acquire said display image of said target object, and output said display image to said output unit, wherein said information generating server includes:

an image acquiring unit including one or more image acquisition cameras for acquiring said internal image;

a display image generating unit configured to estimate a three-dimensional shape of the inside of said target object based on said internal image, and generate said display image, an arbitrary view point image in which said three-dimensional shape is seen from said position indicated by said terminal positional information along said direction indicated by said terminal directional information; and an information generating unit configured to order said output unit to generate information based on a request from said information acquiring unit.

6. The image providing system according to claim 5, wherein the inside of said target object is divided into small blocks as one or more spatial regions, said positional information server further stores in a database, small block information as three-dimensional positional information of said small blocks and retrieval information as information for accessing an information generating server corresponding to said small blocks, said identifying unit identifies a target small block from said small blocks, said information acquiring unit accesses said information generating server corresponding to said target small block identified by said identifying unit and acquires a small block display image of said target small block, and said output unit outputs said small block display image.

7. An image providing method comprising:

identifying a target object pointed by a visual axis which is set to a terminal in order to point said target object as an object which a user intends to identify from a plurality of objects;

accessing an information generating server corresponding to said identified target object; and displaying on an output unit of said terminal, an internal image as an image of an inside of said target object, wherein said internal image can not be seen from said user with eyes, said internal image is an image to be seen along a direction of said visual axis or a direction close to said direction of said visual axis, and said identifying said target object includes:

acquiring said terminal positional information as a position of said terminal;

acquiring object positional information as positional information of said target object;

detecting a face and both eyes of user from an image acquired by a user image acquisition camera of said terminal;

setting a user position indicating a position of said user at a center point of a line connecting said both eyes of said user based on an image of said face and said terminal positional information; and identifying said target object based on said user position, said terminal positional information, and said object positional information.

8. The image providing method according to claim 7, wherein said identifying said target object further includes:

detecting an object identification instruction;

acquiring terminal directional information as a direction of said terminal; and identifying said target object based on said terminal positional information, said terminal directional information, and said object positional information.

9. The image providing method according to claim 8, wherein said accessing said information generating server includes:

acquiring retrieval information as information for accessing said information generating server corresponding to said target object based on object positional information of said target object;

accessing said information generating server based on said retrieval information;

acquiring an object information list as an output display for a selection of information to be acquired by said user; and displaying said object information list on said output unit of said terminal.

10. The image providing method according to claim 9, wherein said displaying on said output unit includes:

acquiring said internal image from one or more image acquisition cameras installed to said target object;

generating based on said internal image, an display image as an image to be outputted to said terminal; and displaying said display image on said output unit of said terminal.

11. The image providing method according to claim 10, wherein said acquiring said internal image includes:

identifying a close camera as said image acquisition camera closest to said visual axis of said terminal among said image acquisition cameras based on camera positional information indicating positions of said image acquisition cameras, camera directional information indicating directions of said image acquisition cameras, or both of said camera positional information and said camera directional information and based on said terminal positional information, said terminal directional information, or both of said terminal positional information and said terminal directional information; and acquiring said internal image from said close camera.

12. The image providing method according to claim 10, wherein said generating based on said internal image includes:

estimating a three-dimensional shape of the inside of said target object based on said internal image acquired from said image acquisition camera;

generating as said display image, an arbitrary view point image in which said three-dimensional shape is seen from said position of said terminal indicated by said terminal positional information along said direction of said terminal indicated by said terminal directional information; and displaying said arbitrary view point image on said output unit of said terminal.

13. The image providing method according to claim 8, wherein the inside of said target object is divided into small blocks as one or more spatial regions, said acquiring said object positional information includes acquiring small block positional information as three-dimensional positional information of said small blocks, and said identifying said target object based on said terminal positional information, said terminal directional information, and said object positional information includes identifying a target small block based on said terminal positional information, said terminal directional information, and said small block positional information.

14. The image providing method according to claim 10, wherein said acquiring said internal image includes storing said internal image, and said generating based on said internal image includes generating said display image based on said stored internal image.

15. A non-transitory computer-readable recording medium which records a program that when executed causes a terminal to perform a method comprising:

identifying a target object pointed by a visual axis which is set to said terminal in order to point said target object as an object which a user intends to identify from a plurality of objects;

accessing an information generating server corresponding to said identified target object; and displaying on an output unit of said terminal, an internal image as an image of an inside of said target object, wherein said internal image can not be seen from said user with eyes, said internal image is an image to be seen along a direction of said visual axis or a direction close to said direction of said visual axis, and said identifying said target object includes:

acquiring said terminal positional information as a position of said terminal;

acquiring object positional information as positional information of said target object;

detecting a face and both eyes of user from an image acquired by a user image acquisition camera of said terminal;

setting a user position indicating a position of said user at a center point of a line connecting said both eyes of said user based on an image of said face and said terminal positional information; and identifying said target object based on said user position, said terminal positional information, and said object positional information.

* * * * *